(12) United States Patent
Eberlein et al.

(10) Patent No.: US 12,367,403 B2
(45) Date of Patent: Jul. 22, 2025

(54) COMPUTER-AUTOMATED PROCESSING WITH RULE-SUPPLEMENTED MACHINE LEARNING

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

(*) Notice: Subject to any disclaimer, the term of this patent is extended or adjusted under 35 U.S.C. 154(b) by 1063 days.

(21) Appl. No.: 17/332,223

(22) Filed: May 27, 2021

(65) Prior Publication Data

US 2022/0383154 A1 Dec. 1, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | | | |
|---|---|---|---|---|
| 5,949,676 A | * | 9/1999 | Elsley | G05B 23/0229 700/79 |
| 2014/0019398 A1 | * | 1/2014 | Engel | G06N 5/02 706/46 |
| 2019/0026148 A1 | * | 1/2019 | Hammond | G06Q 10/06 |
| 2019/0057087 A1 | * | 2/2019 | Dandamudi | G06F 16/93 |
| 2021/0004949 A1 | * | 1/2021 | Broyda | G06V 30/224 |
| 2021/0334682 A1 | * | 10/2021 | Darmour | G06N 3/08 |
| 2021/0342418 A1 | * | 11/2021 | Mortimer | G06Q 50/20 |
| 2022/0014425 A1 | * | 1/2022 | Mandliwala | H04L 63/1416 |
| 2022/0237415 A1 | * | 7/2022 | Lohia | G06F 18/2155 |
| 2022/0383154 A1 | * | 12/2022 | Eberlein | G06N 5/04 |

OTHER PUBLICATIONS

"European Application Serial No. 21202314.7, Extended European Search Report mailed Mar. 18, 2022", 8 pgs.
Tian, Huangshi, "Continuum: A Platform for Cost-Aware, Low Latency Continual Learning", 15 pgs.

\* cited by examiner

*Primary Examiner* — David E Choi
(74) *Attorney, Agent, or Firm* — SCHWEGMAN LUNDBERG & WOESSNER, P.A.

(57) ABSTRACT

Various examples are directed to systems and methods for executing a computer-automated process using trained machine learning (ML) models. A computing system may access first event data describing a first event. The computing system may execute a first ML model to determine an ML characterization of the first event using the first event data. The computing system may also apply a first rule set to the first event data to generate a rule characterization of the first event. The computing system may determine an output characterization of the first event based at least in part on the rule characterization of the first event and determine to deactivate the first rule set based at least in part on the ML characterization of the first event.

20 Claims, 14 Drawing Sheets

COMPUTER-AUTOMATED PROCESSING WITH RULE-SUPPLEMENTED MACHINE LEARNING

BACKGROUND

Computing systems are used to automate various processes to reduce or eliminate human labor necessary to perform the processes.

BRIEF DESCRIPTION OF DRAWINGS

The present disclosure is illustrated by way of example and not limitation in the following figures.

DETAILED DESCRIPTION

Figure 1:
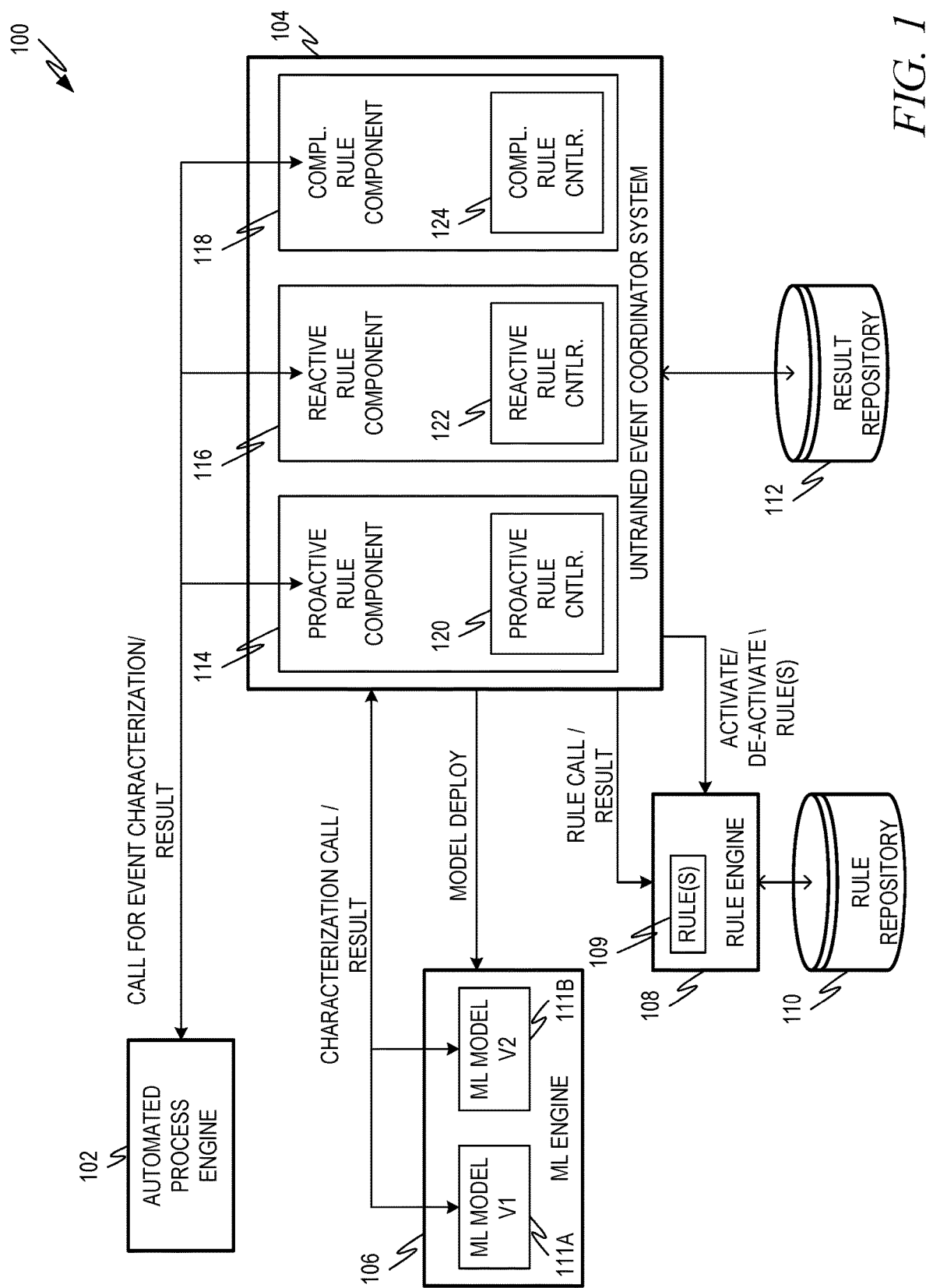
FIG. 1 is a diagram showing one example of a computing system environment for executing a computer-automated process using one or more machine learning (ML) models supplemented by one or more rule sets.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Computer-automated processes can utilize ML models to increase the accuracy of event characterizations in a way that reduces or, in some cases, even eliminates the need for human intervention in the processes. An ML model is trained to characterize incoming events. For example, the ML model may classify or score an incoming event. The classification and/or score is then used to select a next action in the computer-automated process.

Consider an example in which ML-based computer automation is executed in an enterprise resource planning (ERP) computing system to support the selection of a candidate for an open job position. Each candidate for the position represents an event that is characterized using an ML model. The ML model is trained to characterize candidates using training data, such as data describing candidates for previous positions and their determined desirability or fit. Candidate characterizations generated by the ML model may be used to determine which candidates should proceed to the next stage of consideration, such as an interview. The ML model may characterize the candidates by generating classifications (e.g., proceed or not) and/or by generating scores for the candidates in one or more categories.

Consider another example in which ML-based computer automation is executed in an information technology (IT) computing system to manage service requests directed to an IT help desk. The service requests may represent events. A trained ML model characterizes the incoming service requests, for example, by assigning incoming service requests to corresponding next actions. Next actions may include, for example, modifying a software or hardware setting, ordering a piece of hardware, sending an automated instruction to a user, etc. The ML model may be trained, in some examples, with training data derived from previous IT help desk service requests.

Consider yet another example in which an ML model is used to estimate the run time of a piece of software code. Events may be executions, or planned executions of the piece of software code. A trained ML model characterizes the execution or planned execution of the piece of software code by assigning an estimated run time to the execution or planned execution. Next actions may include, for example, modifying the operation of the system, assigning processing resources (either to or away from the execution of the piece of software code) or other actions.

The use of ML models in computer-automated processes can provide significant advantages by generating accurate characterizations of events that may allow all or parts of the computer-automated processes to proceed with human intervention reduced or even eliminated. For example, a computer-automated process implementing the candidate review described above may select candidates for an interview or other more detailed review automatically. Also, a computer-automated process for handling IT help desk service requests may resolve all or a significant portion of the service requests without the need for a human help desk specialist to intervene.

Along with the advantages of using ML models in computer-automated processes, there are several challenges. For example, an ML model is only as good as the training data used to train it. As a result, computer-automated processes using ML models may be vulnerable when the ML models encounter untrained events outside of the problem space covered by the training data, referred to herein as an untrained event. An untrained event can occur when an ML model is presented with an event that was not described (or not adequately described) by the training data on which the ML model was trained. Because the ML model is not trained to handle the untrained event, it either fails to generate a characterization or generates an incorrect characterization. If a characterization is not generated (or not generated with sufficient confidence), then the computer-automated process may trigger a manual intervention by a human user, meaning the process is no longer automated. If an incorrect characterization is generated, the ML model may trigger an incorrect next action, which can lead to incorrect results and may also lead to human intervention.

An untrained event can also arise if it becomes desirable for the ML model to characterize a type of event differently than the way the event was characterized by the ML models' training data. In this example, the event or type of event becomes an untrained event when the desired characterization changes. For example, returning to the candidate/resume example, if the open position is in a new field or in a new geographic location not reflected by the previous training data, the ML model may be trained with historic candidate data that incorrectly characterizes candidates in the new field or new geographic location. Incorrect characterizations may require manual intervention to detect and correct.

When untrained events are encountered in an ML-based computer-automated process, the ML model can be retrained to correctly handle untrained events using new training data that reflects the untrained events and their proper characterizations. Retraining takes time, however, both to accumulate new training data reflecting an untrained event and to retrain the ML model to correctly characterize the untrained event. Before retraining is complete, manual intervention may be required to correctly characterize an untrained event. For example, a human user may detect the untrained event and manually set the output to the desired characterization. Manual intervention may also be required to determine when the ML model is suitably retrained for an untrained event or type of untrained event, rendering further manual intervention unnecessary. This can result in increased use of expensive human resources as well as longer process times and reduced service level agreement (SLA) compliance.

Various examples described herein address these and other problems by executing computer-automated processes that supplement an ML model with one or more rule sets. When an incoming event is received, the computing system performing a computer-automated process executes the ML model to generate an ML characterization of the incoming event. The computing system also executes a detection rule set comprising rules for identifying one or more untrained events. If the result of the detection rule set indicates that the incoming event is not an untrained event (e.g., that the ML model is suitably trained to characterize the incoming event), then the computing system returns the ML characterization of the event as an output characterization and performs subsequent steps of the computer-automated process based on the ML characterization.

If the result of the detection rule set indicates that the event is an untrained event, then the computing system applies one or more event characterization rules associated with the untrained event to generate a rule characterization. The rule characterization may be returned as the output characterization of the incoming event and subsequent steps of the computer-automated process performed based on the rule characterization. In other examples described herein the rule characterization and ML characterization are combined to generate a supplemented characterization of the untrained event and subsequent steps of the computer-automated process are performed using the supplemented characterization.

In various examples, the ML characterization of an untrained event is used to determine when the ML model has been suitably re-trained to correctly characterize the untrained event. For example, untrained events received by the ML model may be used as new training data to retrain the ML model to correctly characterize future untrained events of the same type. The ML characterization of an untrained event may be compared to an untrained event standard. If the ML characterization meets the untrained event standard, it may indicate that the ML model is sufficiently trained to characterize the untrained event and events of a similar type. When this occurs, rules for detecting and/or characterizing the previously-untrained event may be deactivated. For example, when a rule for detecting and/or characterizing a previously-untrained event is deactivated, the rule may not be applied in the future to potential untrained events.

FIG. 1 is a diagram showing one example of a computing system environment 100 for executing a computer-automated process using one or more ML models 111A, 111B supplemented by one or more rule sets. The computing system environment 100 comprises various elements including an automated process engine 102, an untrained event coordinator 104, an ML engine 106, and a rule engine 108. The elements 102, 104, 106, 108 may be implemented using one or more computing devices such as, for example, server computing devices, user computing devices, etc. In some examples, some or all of the elements 102, 104, 106, 108 are executed as part of a database management system, such as the in-memory database management system 1000 described herein with respect to FIGS. 10-13.

The automated process engine 102 executes a computer-automated process. For example, the automated process engine 102 may be or include an ERP computing system or other computing system that implements a candidate review process. In some examples, the automated process engine 102 is or includes an IT computing system for implementing an IT help desk process as described herein. In other examples, the automated process engine 102 can execute other computer-automated processes.

The automated process engine 102 is configured to access incoming events and to request characterizations of the events. Accessing an incoming event may include receiving data describing the incoming event from another system, retrieving data describing the incoming event from a data storage of the automated process engine 102, and/or the like. Upon receiving an event characterization, the automated process engine 102 selects a next step of the computer-automated process using the received characterization. For example, when the automated process engine 102 executes a candidate review process, it may receive a candidate resume. The automated process engine 102 may request a characterization of the resume and then generate a recommended next action for the candidate. When the automated process engine 102 executes an IT help desk process, it may receive events including a service request message. The automated process engine 102 may request a characterization of the service request message and executes a next action based on the characterization.

The ML engine 106 executes one or more ML models 111A, 111B. The ML engine 106 may receive one or more characterization requests. A characterization request includes a set of features describing an incoming event. The set of features describing an event may be referred to as a feature set or feature array. For example, the feature set for a candidate resume event may include information from the resume and/or other information about the candidate. The feature set for a help desk service request event may include details included with the service request message, and so on. Upon receiving a characterization request, the ML engine executes one or more ML models 111A, 111B to generate an ML characterization of the incoming event. The ML characterization is returned to the automated process engine 102 as the output characterization.

In some examples, the ML engine 106 is also configured to train and/or re-train the ML models 111A, 111B. The ML engine 106 may receive untrained event data, for example, from the untrained event coordinator 104 as described herein. The untrained event data may include feature sets describing desired characterizations for the untrained events. The ML engine 106 applies the untrained event data as new training data to retrain the one or more of the ML models 111A, 111B. As additional untrained event data is received, the ML models 111A, 11B can be better trained to characterize untrained events until, as described herein, it is determined that incoming events that were previously untrained can be accurately characterized by the ML model 111A or 111B.

In some examples, ML model 111A is a deployed ML model and ML model 111B is a training ML model. The ML engine 106 uses the deployed ML model 111A to generate ML characterizations for events that are not untrained events. The training ML model 111B may be retrained with new training data describing untrained events. In some examples, the ML engine 106 uses the training ML model 111B to generate ML characterizations of untrained events, for example, to judge the progress of the training ML model 111B towards being trained to accurately characterize the untrained events. When the new version of the ML model 111B is suitably trained to handle untrained events, it may be deployed as described herein.

The ML models 111A, 111B executed by the ML engine 106 may be or include any suitable ML models trained to characterize an incoming event including supervised learning and unsupervised learning models. In some examples, the ML models 111A, 111B may be or include a classification model, such as a logistic regression model, a naive Bayes model, a K-nearest neighbors model, a decision tree model, a random forest model, a support vector machine (SVM) model, and so on.

The rule engine 108 is configured to apply one or more rules 109. The rule engine 108 may apply one or more detection rules and/or one or more characterization rules. Detection rules are applied to determine whether an event indicated by an event characterization request is an untrained event. Characterization rules are applied to a feature set describing an incoming event to generate a characterization of the incoming event.

The rule engine 108, in some examples, stores one or more rules 109 at a rule repository 110. In some examples, the rule engine 108 is executed at a database management system, such as using the in-memory database management system described at FIGS. 10-13 herein. The rule repository 110, accordingly, may be implemented at the database. In some examples, rules 109 may be developed and deployed to the rule engine 108 (e.g., for use and storage at the rule repository 110) by one or more rule developer users.

The rule engine 108 may also be configured to selectively activate or de-activate detection rules and/or characterization rules, for example, in response to an instruction from the untrained event coordinator 104 as described herein. For example, when the training ML model 111B is trained or re-trained to accurately characterize an untrained event, the rule engine 108 may be instructed to de-activate corresponding detection rules and/or characterization rules. Accordingly, applying the detection rules to subsequent incoming events received from the automated process engine 102 may indicate that the incoming events are not untrained and, therefore, that the ML characterization of the event can be returned to the automated process engine 102 as the output characterization.

In some examples, the rule engine 108 is configured to manage detection rules and/or characterization rules for more than one type of untrained event. The detection rules, then, may include multiple sets of one or more rules where each set of rules is to detect untrained events of a different type. Consider again the example in which the automated process engine 102 executes an IT help desk service. One type of untrained event may correspond to one type of new problem with a first software application while another type of untrained event may correspond to another type of new problem, for example, with a second software application. Yet another type of untrained event may correspond to a new problem with a common hardware component, and so on. In this example, the detection rules may include a set of one or more rules that is developed to detect the new problem with the first software application, a set of one or more rules that is developed to detect the new problem with the second software application, a set of one or more rules that is developed to detect the new problem with the common hardware component, and so on.

The sets of detection rules for different untrained events types may be separately activated or deactivated. For example, the ML model 111A or 111B may be suitably retrained to characterize untrained events of a first type, but not of a second type. In this example, the set of detection rules for detecting untrained events of the first type may be deactivated in the detection rules while the set of rules for detecting untrained events of the second type may remain active.

In some examples, the rule engine 108 also applies sets of characterization rules that are specific to different untrained event types. Returning to the IT help desk service example above, a first set of one or more characterization rules is developed to characterize the new problem with the first software application, a set of one or more characterization rules is developed to characterize the new problem with the second software application, a set of one or more characterization rules is developed to characterize the new problem with the common hardware component, and so on.

In some examples, detection and/or characterization rules may be common across different untrained event types. For example, an example detection rule may be applied to detect untrained events of both a first type and a second type. Also, there may be characterization rules that are applied to characterize events of more than one type. When there are characterization rules or detection rules in common across different untrained event types, disabling such a common rule for one event type may not prevent the common rule from being applied to untrained events of different types.

The environment 100 of FIG. 1 also includes an untrained event coordinator system 104. In the example environment 100 of FIG. 1, automated process engine 102 is configured to direct calls for event characterization to the untrained event coordinator 104. The untrained event coordinator 104 manages the ML engine 106 and rule engine 108 to generate event characterizations using the ML models 111A, 111B of the ML engine 106 supplemented by the rules 109 of the rule engine 108 as described herein. The resulting event characterizations are returned to the automated process engine 102 as output characterizations. The automated process engine 102 uses the output characterizations to select and/or execute a next action of the automated process.

In some examples, the untrained event coordinator 104 is configured to store result data, such as untrained event ML characterizations and untrained event rule characterizations, at a result repository 112. The result data may also be provided to the ML engine 106 for use as training data.

Upon receiving an event characterization request from the automated process engine 102, the untrained event coordinator 104 sends a request to the rule engine 108 requesting that the rule engine 108 execute a set of one or more detection rules to determine whether the first event is an untrained event. The request to the rule engine 108 may include some or all of the feature set describing the incoming event.

The untrained event coordinator 104 may also send a corresponding event characterization request for the incoming event to the ML engine 106, which executes one or more of the ML models 111A, 111B to generate and return an ML characterization of the first event to the untrained event coordinator 104. In some example, the ML model executed to determine the ML characterization depends on whether the incoming event is an untrained event. If the incoming event is not an untrained event, the untrained event coordinator 104 may request that the ML engine 106 generate an ML characterization using the deployed ML model 111A. If the incoming event is an untrained event, the untrained event coordinator 104 may request that the ML engine 106 generate an ML characterization using the training ML model 111B.

If the application of the detection rules indicates that the incoming event is not an untrained event, the untrained event coordinator 104 returns the ML characterization to the automated process engine 102 as the output characterization of the incoming event. If the application of the detection rules indicates that the incoming event is an untrained event, the untrained event coordinator 104 requests that the rule engine 108 apply characterization rules to generate a rules characterization of the incoming event. The rules characterization can be returned to the automated process engine 102 as the output characterization of the untrained event. In some examples, the rules characterization and ML characterization are both used to determine a supplemental characterization that is returned to the automated process engine 102 as an output characterization.

The untrained event coordinator 104 may also be programmed to determine when an ML model 111A, 111B is suitably trained to handle untrained events without relying on the rule characterization. For example, when an untrained event is detected, characterization rules are used to determine the incoming event characterization provided to the automated process engine 102. Data from the incoming event, however, may be saved (e.g., at result repository 112) and used as training data for the training ML model 111B. As more untrained events are received and processed by the untrained event coordinator 104, more training data is generated, allowing the training ML model 111B to be trained in a way that allows the training ML model to be made increasingly accurate in characterizing untrained events.

The untrained event coordinator 104 is programmed to utilize the ML characterizations generated for detected untrained events to determine whether the training ML model 111B has been suitably trained to characterize untrained events. When the training ML model 111B is suitably trained to characterize untrained events, the untrained event coordinator 104 may deploy the training model 111B as the new deployed model 111A and de-activate some or all of the untrained event detection rules related to the untrained events. In this way, incoming events that can be suitably characterized by the ML engine 106 are no longer detected as an untrained event. Accordingly, the ML characterization of such events may be returned to the automated process engine 102 as the output characterization of the incoming event.

In the example of FIG. 1, the untrained event coordinator 104 includes components 114, 116, 118 for handling three categories of rules for handling untrained events. Proactive rules are considered at a proactive rule component 114. Reactive rules are handled at a reactive rule component 116. Complimentary rules are handled by a complimentary rule component 118. The untrained event coordinator 104 may be configured to implement any combination of the three rule components 114, 116, 118 either individually or in combination. The different rule types differ, for example, in how and when detection rules are applied and, for example, in how rule characterizations are determined.

The proactive rule component 114 uses proactive detection rules to identify untrained events of various types. When an incoming event characterization event is received from the automated process engine 102, proactive detection rules are applied to the feature set describing an incoming event to determine whether the incoming event is an untrained event. Consider again the example in which the automated process engine 102 implements a candidate review process. Example proactive detection rules might ask whether a resume event is directed towards an open position in a new field, whether the candidate has a listed skill set in the new field, whether the resume event is directed towards an open position in a new geographic location, etc. Consider also the example in which the automated process engine 102 implements an IT help desk process. Example proactive detection rules might ask whether an incoming service request identifies a known new problem and/or symptoms associated with the known new problem. In some examples, proactive detection rules may include rules or sets of rules for detecting different types of untrained events, as described herein.

The proactive rule component 114 may comprise a proactive rule controller 120 that manages aspects of a proactive rule process flow. For example, when the untrained event coordinator 104 receives a call for event characterization, the proactive rule controller 120 may provide the feature set of the incoming event to the rule engine 108 with a request that the currently-active proactive rule set be applied. If the currently-active proactive rule set indicates that the incoming event is an untrained event, then the proactive rule controller 120 may send an additional request to the rule engine 108 that a characterization rule set be applied to the feature set of the incoming event to generate a rule characterization of the incoming event. The proactive rule controller 120 may return the rule characterization to the automated process engine 102 as the output characterization of the incoming event.

The proactive rule controller 120 may also be configured to determine whether the training ML model 111B has been suitably trained to handle future instances of the incoming untrained event (or events of a similar type). The proactive rule controller 120 obtains an ML characterization of the incoming untrained event generated using the training ML model 111B. The proactive rule controller 120 determines whether the ML characterization of the incoming rule event meets an untrained event standard. The untrained event standard may be a level of accuracy of the ML characterization and may be applied over a single untrained event and/or over a set of multiple untrained events. For example, if the ML models 111A, 111B are classification models, the untrained event standard may be met when the training ML model 111B has correctly classified an untrained event type in more than X % of the previous times that the training ML model 111B has been asked to characterize events of the untrained event type. In another example, the ML models 111A, 111B may provide a confidence score indicating an accuracy of the ML characterization. In some examples, the untrained event standard is met if the confidence score for the ML characterization generated by the training ML model 111B is above a threshold level. When the untrained event standard for an untrained event or untrained event type is met, the proactive rule controller 120 instructs the rule engine 108 to deactivate the proactive detection rules associated with the untrained event type.

The reactive rule component 116 uses reactive rules to identify untrained events. Reactive rules are applied using ML characterizations generated by the deployed ML model 111A. For example, the ML model 111A, as described herein, may be configured to generate a confidence score indicating an accuracy of the ML characterization. If the confidence score for an ML characterization is below a threshold level, the untrained event coordinator 104 may be configured not to return the ML characterization to the automated process engine 102. Instead, the untrained event coordinator 104 may apply one or more reactive detection rules to the ML characterization and/or feature set of the corresponding incoming event. If an untrained reactive detection rule set indicates that an incoming event is an untrained event, the untrained event coordinator 104 may apply one or more characterization rules to generate a rule characterization of the event. The rule characterization may be returned to the automated process engine 102 as the output characterization of the incoming event.

A reactive rule component 116 may comprise a reactive rule controller 122 that manages aspects of a reactive rule process flow. For example, upon receiving an indication that the ML characterization of an incoming event had a confidence score below a threshold, the reactive rule controller 122 may request that the rule engine 108 apply a reactive detection rule set to the incoming event. If the application of the reactive detection rule set indicates that the incoming event is an untrained event, the reactive rule component 116 may request that the rule engine 108 apply one or more characterization rules to generate a rule characterization of the incoming event. The rule characterization may be provided to the automated process engine 102 as the characterization of the incoming event.

The reactive rule controller 122 may also be configured to determine whether the deployed ML model 111A has been suitably trained to handle future instances of an incoming untrained event (or events of a similar type). For example, for reactive rules, the training model 111B may be iteratively deployed when it is trained on available training data. The reactive rule controller 122 may, for example, compare the number of incoming events that have an ML characterization below the threshold level with the number of incoming events of a given type that are determined to be untrained events by the reactive detection rules. If the percentage of detected untrained events of the given type is below a threshold level, the reactive rule controller 122 may determine that the deployed ML model 111A is suitably trained to handle the untrained events and reactive detection rules for the untrained events may be deactivated.

The complimentary rule component 118 uses complimentary rules to characterize untrained events using a rule characterization and the ML characterization. For example, the complimentary rule component 118 may be utilized for ML characterizations that include a value, such as a score. A complimentary detection rule or rules may be applied to the ML characterization and/or the feature set of the incoming event to detect an untrained event. When an untrained event is detected, a characterization rule or rules may be applied to generate a characterization of the incoming event based on the ML characterization of the event and on a rule characterization of the event.

Consider again the candidate resume example above. The ML characterization of a candidate resume event may include an experience score reflecting a numerical indication of the candidate's experience that is relevant to the open position. It may be determined that the experience score generated by the ML model 111A, 111B underweights a first type of experience. A complimentary detection rule may identify incoming resume events indicating a candidate that has the first type of experience. A characterization rule may be applied to determine an experience score supplementary amount based on the first type of experience. A supplemented characterization of the incoming event is determined by combining the supplementary amount and the experience score (e.g., using addition, multiplication, concatenation, etc.).

Consider another example automated process based on an estimated runtime for a piece of software code. In this example, an incoming event may be a call to the software code. The ML characterization may be or include the estimated runtime for the called code. In this example, a complimentary detection rule may identify calls to the software code having a new feature that indicates that the event is untrained such as, for example, the call is being made by a new component, the call includes input parameters that that the ML model 111A, 111B is not adequately trained to model, etc. A complimentary characterization rule may be applied to determine a supplementary runtime for the software code, which may be negative or positive. A supplemented characterization of the incoming event may be determined by combining the supplementary amount with the estimated runtime indicated by the ML characterization. The supplemented characterization may be used by the automated process engine 102, for example, to determine when to initialize or initiate one or more subsequent steps of the computer-automated process.

The complimentary rule component 118 may include a complimentary rule controller 124 that manages aspects of a proactive rule process flow. For example, the complementary rule controller 124 may be provided with ML characterizations of incoming events generated by the ML engine 106 and/or with corresponding feature sets of the incoming events. The complimentary rule controller 124 may request that the rule engine 108 apply one or more complimentary detection rules to the ML characterization and/or the feature set. If an untrained event is detected, the complimentary rule controller 124 may request that the rule engine 108 apply one or more complimentary characterization rules to generate the supplementary value for the incoming event. The supplementary value for the incoming event may be combined with the ML characterization to generate a supplemented characterization, which is returned to the automated process engine 102 as the output characterization of the incoming event.

The complimentary rule controller 124 may also be configured to determine whether the training ML model 111B has been suitably trained to handle future instances of an incoming untrained event (or events of a similar type). In examples using the complimentary rule component, the supplemented characterization may be determined using the ML characterization generated by the deployed ML model 111A. A second ML characterization generated by the training ML model 111B may be used by the complimentary rule controller 124 to determine whether the training ML model 111B is suitably trained to characterize the untrained events. For example, if a difference between the supplemented characterization of the incoming event and the second ML characterization generated by the training ML model 111B is less than a threshold, the complimentary rule controller 124 may determine that the training ML model 111B is suitably trained for the untrained event. The complimentary rule controller 124 may instruct the ML engine 106 to deploy the training ML model 111B and may also instruct the rule engine 108 to disable the set of one or more complimentary detection rules corresponding to the untrained event (or untrained events of a similar type).

Figure 2:
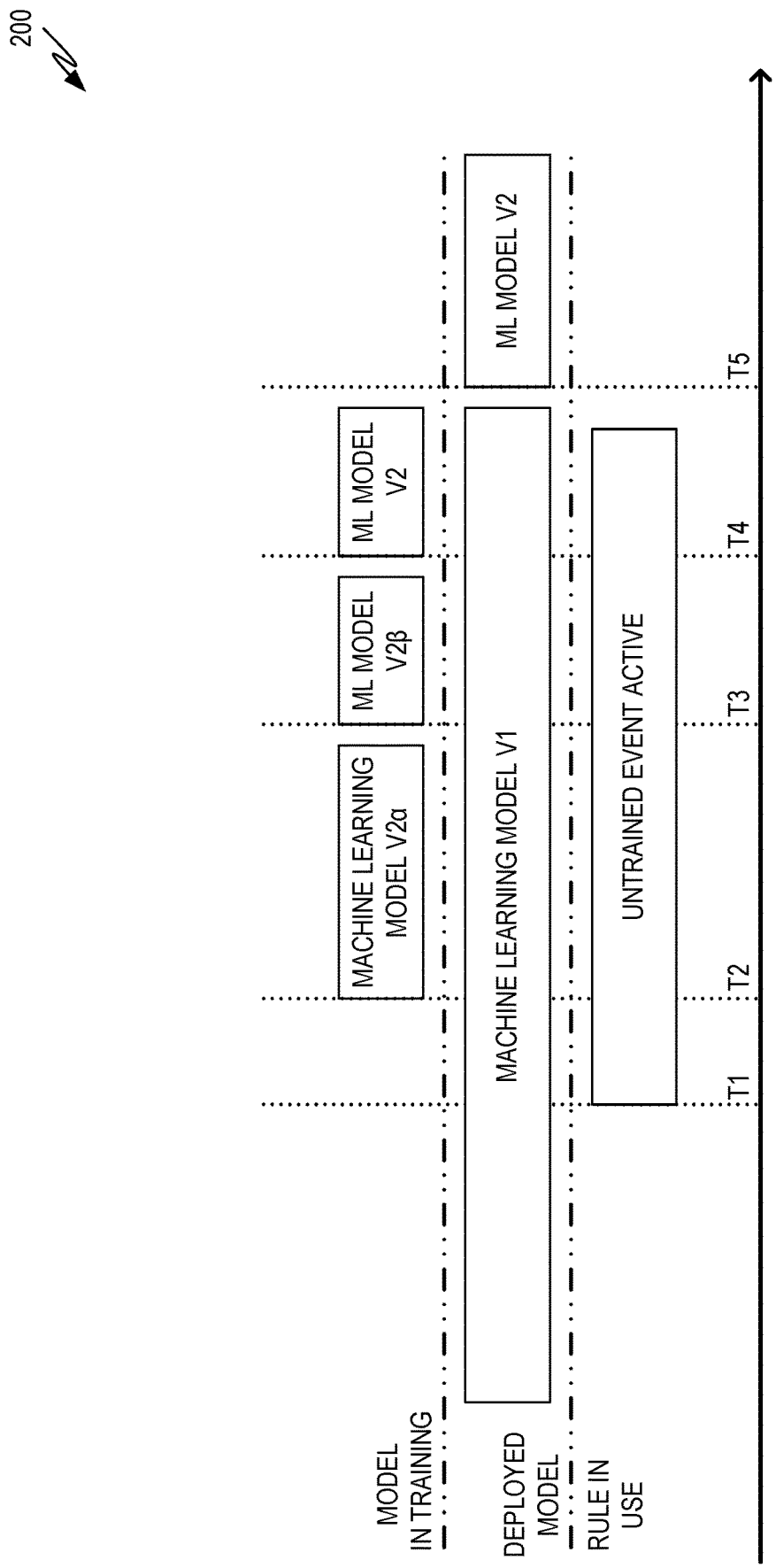
FIG. 2 is a diagram showing one example of a workflow for executing a computer-automated process using ML models supplemented by one or more rule sets.

FIG. 2 is a diagram showing one example of a workflow 200 for executing a computer-automated process using ML models supplemented by one or more rule sets. The workflow 200 includes a horizontal axis indicating time and three lanes indicating the behavior of a computing system, such as the computing system environment 100. A "RULE IN USE" lane indicates when a detection rules set is in use for an untrained event or untrained event type. A "DEPLOYED MODEL" lane indicates when a model is deployed for characterizing events and which model is deployed for characterizing events. A "MODEL IN TRAINING" lane indicates when a model is being retrained and which model is being retrained.

Initially in the workflow 200, the ML model V1 is the deployed model and no untrained events are active. At time T1, an untrained event or untrained event type becomes active. For example, a new type of event may begin presenting. Also, in some examples, it may become desirable to change the way that a previously-trained event is characterized. When the new event becomes active at time T1, untrained event detection rules may be put in place, as described herein, to detect the new event, and untrained event characterization rules may be put in place to generate a rule characterization of the event. When incoming events are determined to be new events using the untrained event detection rules, the computing system may return a characterization that is or is based on the rule characterization.

At time T2, the computing system begins training a training model V2α. The training may be conducted using training data derived from untrained events received between time T1 and T2. At time T3, the computing system may optionally begin training a second training model V2β. For example, the training model V2β may be based on the training model V2α and may be trained using training data from untrained events received between time T1 and time T3. A final version of the training model V2 may begin training at time T4 using training data from untrained events received between time T1 and T4. When the computing system determines that the training model V2 is suitably trained to characterize the untrained events, at time T5, the model V2 is deployed and the untrained event is deactivated, for example, by removing the set of untrained event detection rules corresponding to the untrained event.

Figure 3:
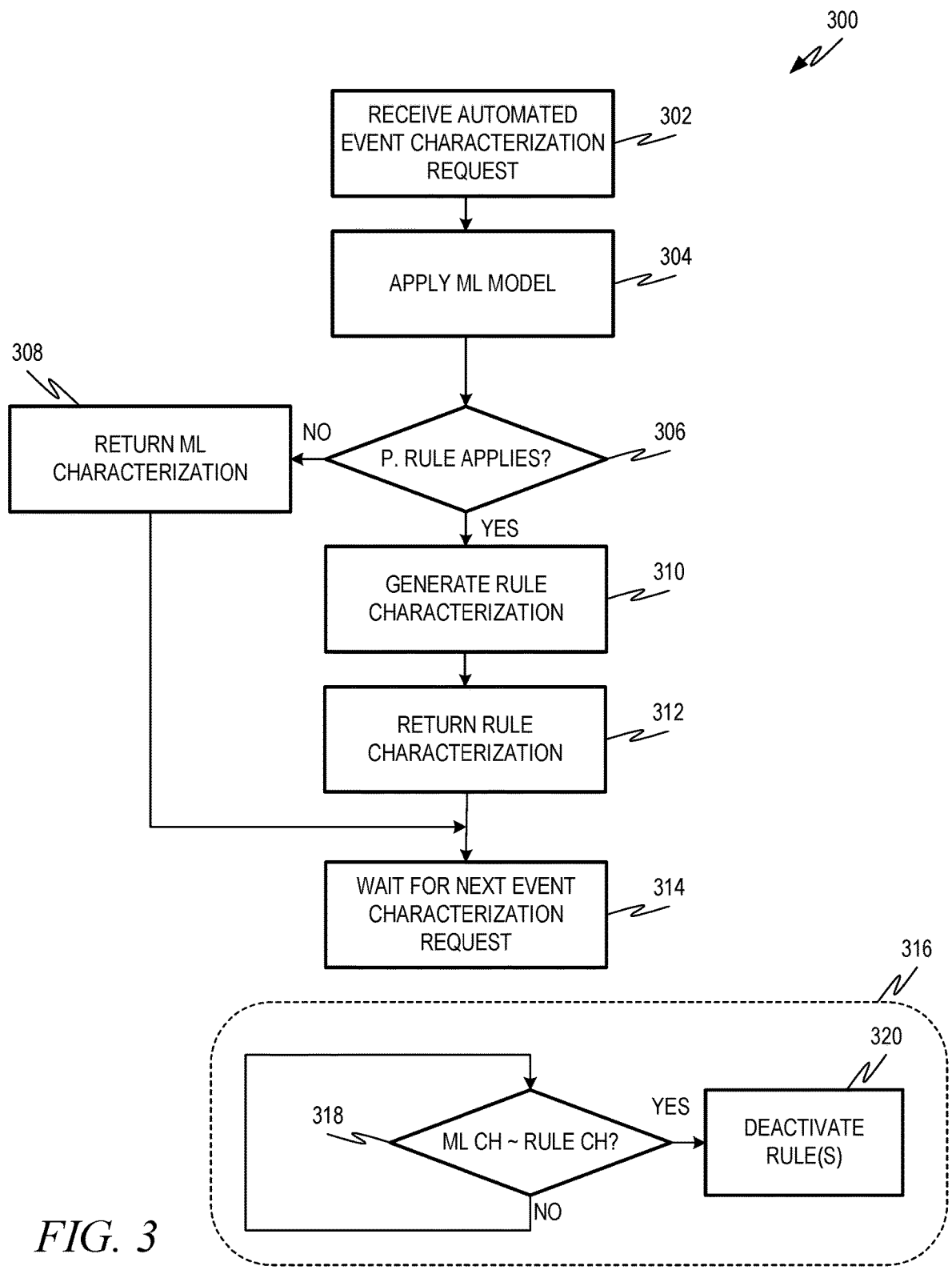
FIG. 3 is a flowchart showing one example of a process flow that may be executed by a computing system to apply one or more proactive rules to an event characterization request.

FIG. 3 is a flowchart showing one example of a process flow 300 that may be executed by a computing system to apply one or more proactive rules as described herein. For example, the process flow 300 may be executed by the proactive rule component 114 and/or proactive rule controller 120 of FIG. 1 in response to an event characterization request from the automated process engine 102.

At operation 302, the computing system receives an event characterization request from a computer-automated process, such as from the automated process engine 102 of FIG. 1. The characterization request includes a feature set for an incoming event. At operation 304, the computing system applies an ML model to generate an ML characterization of the incoming event. At operation 306, the computing system applies one or more proactive detection rules to determine whether the incoming event is an untrained event. As described herein, proactive detection rules may be applied to the feature set describing the incoming event to detect whether the incoming event is an untrained event.

If the application of the one or more proactive detection rules at operation 306 indicates that the incoming event is not an untrained event, then the computing system, at operation 308, returns the ML characterization determined at operation 304 as the output characterization of the incoming event and waits, at operation 314, for the next characterization request.

If the one or more proactive detection rules applied at operation 306 indicates that the incoming event is an untrained event, the computing system generates a rule characterization of the incoming event at operation 310. The rule characterization is generated by applying one or more characterization rules, for example, to the feature set describing the incoming event. At operation 312, the computing system returns the rule characterization determined at operation 310 as the output characterization and waits, at operation 314, for the next event characterization request to be received.

Concurrent with the operations 302, 304, 306, 308, 310, 312, 314, the computing system may periodically execute the operations 316 to determine whether the ML model has been trained to accurately characterize unknown events. The operations 316, in some examples, are executed for every untrained event processed as part of the process flow 300. In other examples, the operations 316 are executed after a certain number of untrained events are processed as part of the process flow 300. In some examples, the operations 316 are executed after a certain number of untrained events of a particular type are processed as part of the process flow 300. In some examples, the operations 316 are executed periodically (e.g., every hour, every ten minutes, etc.).

At operation 318, the computing system determines whether the ML characterization or characterizations of untrained events is within a threshold of the desired characterizations of those events. The untrained events considered at operation 318 may be all untrained events or all untrained events of a particular type. The desired characterizations may be, for example, the rule characterizations. The comparison may be made over a single untrained event and/or over a number of untrained events of a common type. If the ML characterization is not within the threshold of the desired characterization, the computing system may re-execute operation 318, for example, the next time that the operations 316 are executed. If the ML characterization is within the threshold of the desired characterization, then the computing system may deactivate one or more rules associated with the untrained event type at operation 320. The deactivating may include deactivating a set of one or more proactive detection rules associated with the untrained event type and/or deactivating one or more characterization rules associated with the untrained event type.

Figure 4:
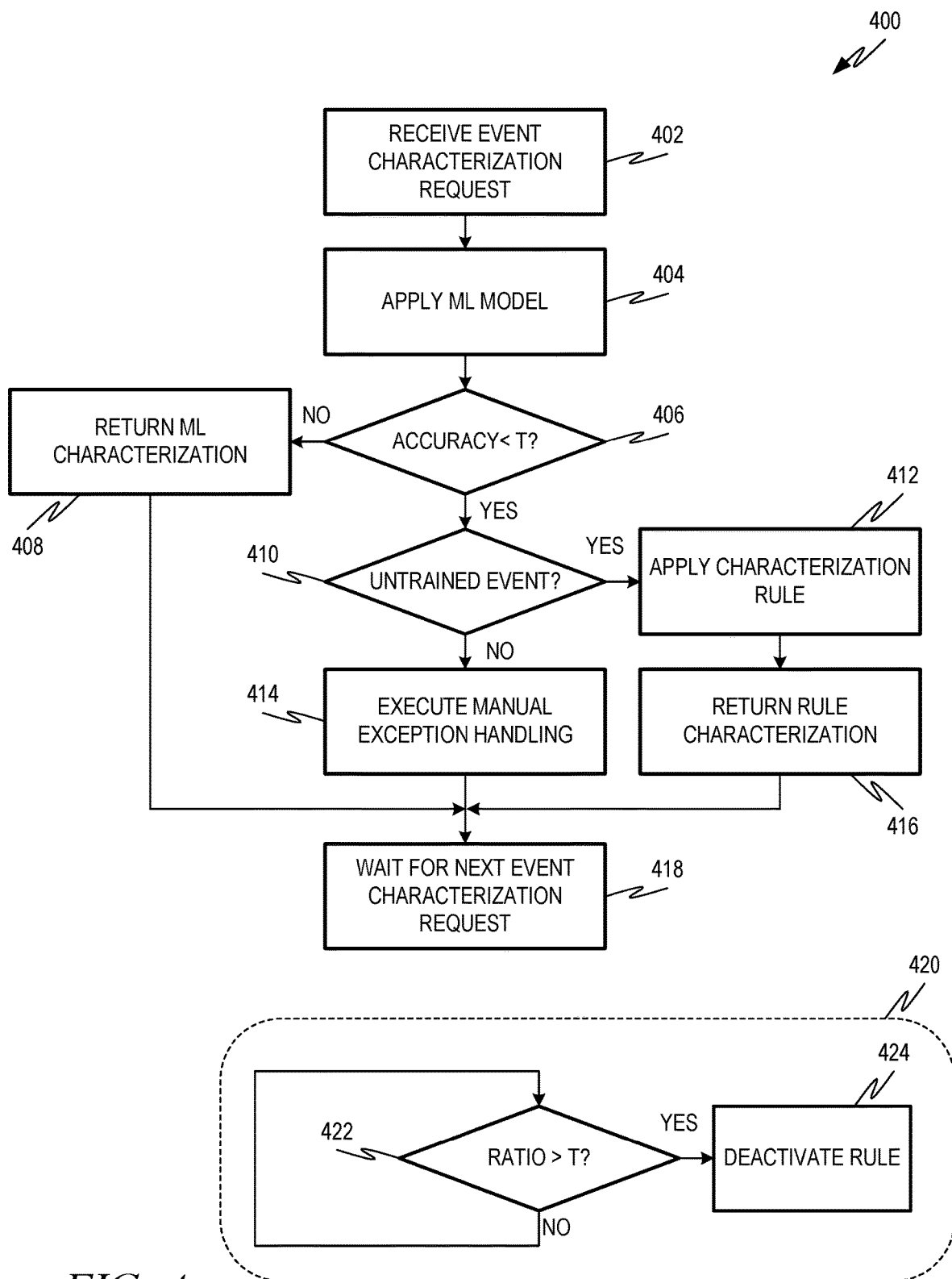
FIG. 4 is a flowchart showing one example of a process flow that may be executed by a computing system to apply one or more reactive rules.

FIG. 4 is a flowchart showing one example of a process flow 400 that may be executed by a computing system to apply one or more reactive rules to an event characterization request as described herein. For example, the process flow 400 may be executed by the reactive rule component 116 and/or reactive rule controller 122 of FIG. 1 in response to an event characterization request from the automated process engine 102.

At operation 402, the computing system receives an event characterization request from a computer-automated process, such as from the automated process engine 102 of FIG. 1. The characterization request includes a feature set for an incoming event. At operation 404, the computing system applies an ML model to generate an ML characterization of the incoming event. At operation 406, the computing system determines if the accuracy of the ML characterization is greater than a threshold value. The accuracy of the ML characterization, in some examples, is based on a confidence score generated by the ML model. If the confidence score generated by the ML model is greater than a confidence threshold value, then the accuracy of the ML characterization is sufficient. If the accuracy of the ML characterization is greater than the threshold, then the ML characterization is returned at operation 408 as the output characterization and the computing system waits at operation 418 for a next event characterization request.

If the accuracy of the ML characterization fails to meet the threshold at operation 406, the computing system applies one or more reactive detection rules to determine, at operation 410, whether the incoming event is an untrained event. If the reactive detection rules do not indicate that the incoming event is an untrained event, the computing system executes a manual exception handling routine at operation 414 to handle the characterization request. For example, if the accuracy of the ML characterization is insufficient at operation 406 and the reactive detection rules do not identify the incoming event as an untrained event at operation 410, then manual intervention may be initiated to determine a proper characterization of the event.

If the reactive detection rules do indicate that the incoming event is an untrained event, then the computing system may apply one or more characterization rules at operation 412 to generate a rule characterization of the incoming event. The rule characterization may be returned at operation 416 as the output characterization and the computing system may wait, at operation 418, for the next event characterization request.

Concurrent with the operations 402, 404, 406, 408, 410, 412, 414, 416, 418, the computing system may periodically execute the operations 416 to determine whether the ML model has been trained to accurately characterize unknown events. The operations 420, in some examples, are executed for every untrained event processed as part of the process flow 400. In other examples, the operations 420 are executed after a certain number of untrained events are processed as part of the process flow 400. In some examples, the operations 420 are executed after a certain number of untrained events of a particular type are processed as part of the process flow 400. In some examples, the operations 420 are executed periodically (e.g., every hour, every ten minutes, etc.).

At operation 422, the computing system determines whether the ratio of manual exception events to untrained events detected at operation 410 is greater than a threshold. This action may be performed with respect to all untrained events or with respect to all untrained events of a particular type. Also, in some examples, operation 422 is executed with respect to untrained events received over a given period of time. If the ratio of manual exception events to untrained events is greater than a certain threshold, it may indicate that fewer untrained events are occurring and that the ML model is being retrained to handle the untrained events (or untrained events of the relevant type). Accordingly, the computing system may, at operation 424, deactivate a rule set for determining the untrained event or event type considered at operation 422. If the ratio of manual exception events to untrained events is not greater than the threshold, then no change may be made and the operation 422 may be re-executed, for example, after a predetermined time, number of events, etc.

Figure 5:
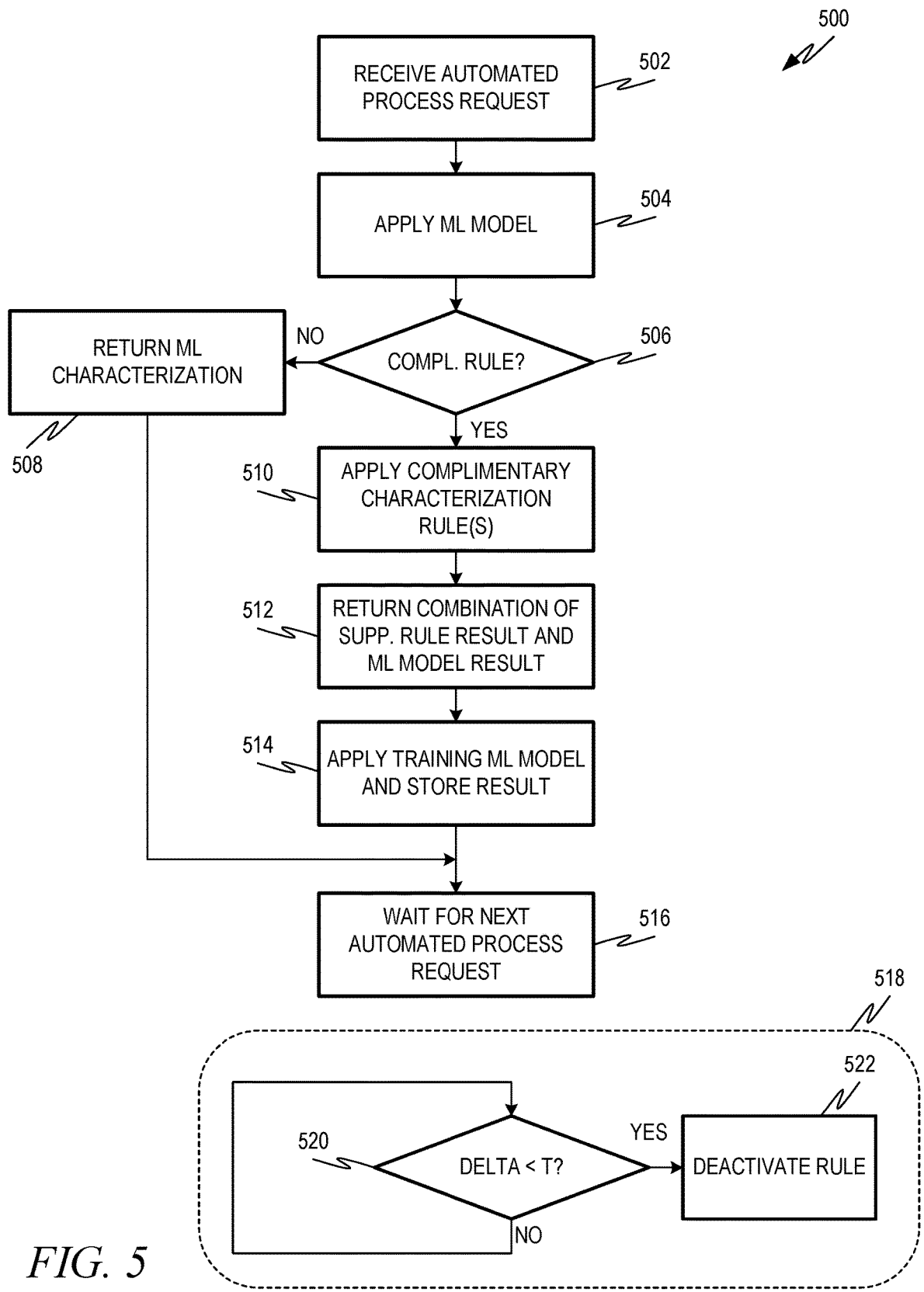
FIG. 5 is a flowchart showing one example of a process flow that may be executed by a computing system to apply one or more complimentary rules to an event characterization request.

FIG. 5 is a flowchart showing one example of a process flow 500 that may be executed by a computing system to apply one or more complimentary rules to an event characterization request, as described herein. For example, the process flow 500 may be executed by the complimentary rule component 118 and/or the complimentary rule controller 124 of FIG. 1.

At operation 502, the computing system receives an event characterization request from a computer-automated process, such as from the automated process engine 102 of FIG. 1. The characterization request includes a feature set for an incoming event. At operation 504, the computing system applies an ML model to generate an ML characterization of the incoming event. At operation 506, the computing system applies one or more complimentary detection rules to detect whether the event is an untrained event. If the complimentary detection rules do not indicate an untrained event, the computing system, at operation 508, returns the ML characterization generated at operation 504 as the output characterization and waits for the next event characterization request at operation 516.

If the application of the complimentary detection rules indicates that the incoming event is an untrained event, the computing system applies one or more complimentary characterization rules to the feature set of the incoming event at operation 510 to generate a supplementary value for the incoming event. The supplementary value is combined with all or a portion of the ML characterization of the incoming event to generate a supplemented characterization of the incoming event. The combining may include adding the supplementary value and ML characterization, multiplying the supplementary value and ML characterization, concatenating the supplementary value and ML characterization, etc. The supplemented ML characterization is returned as the output characterization at operation 512.

At operation 514, the computing system uses a training ML model, such as the second version of the ML model 111B, to generate an updated ML characterization of the incoming event. In this example, as described herein, the ML model used at operation 504 may not be updated with new training data. The ML model applied to generate the updated ML characterization at operation 514 may be updated with new training data generated from untrained events as described herein. The updated ML characterization may be stored for used as described herein and the computing system may wait for the next event characterization request at operation 516.

Concurrent with the operations 502, 504, 506, 508, 510, 512, 514, 516, the computing system may periodically execute the operations 518 to determine whether the training ML model has been trained to accurately characterize unknown events. The operations 518, in some examples, are executed for every untrained event processed as part of the process flow 500. In other examples, the operations 518 are executed after a certain number of untrained events are processed as part of the process flow 500. In some examples, the operations 518 are executed after a certain number of untrained events of a particular type are processed as part of the process flow 500. In some examples, the operations 518 are executed periodically (e.g., every hour, every ten minutes, etc.).

At operation 520, the computing system determines a difference or delta between the updated ML characterizations generated with the training ML model and the desired characterization of the event or event types considered. The desired characterization may be, for example, the supplemented characterization. The computing system determines if the delta is less than a threshold. The comparison at operation 520 may be over all untrained events or over untrained events of a common type. If the delta is not less than a threshold, then the operation 520 may re-evaluate, for example, the next time that it is scheduled or otherwise expected to execute. If the delta at operation 520 is less than the threshold, it indicates that the training ML model is suitably trained to handle untrained events (e.g., untrained events of the type considered at operation 520). Accordingly, the computing system may deactivate, at operation 522, one or more supplementary detection rules for identifying untrained events and/or untrained events of the type considered at operation 520.

Figure 6:
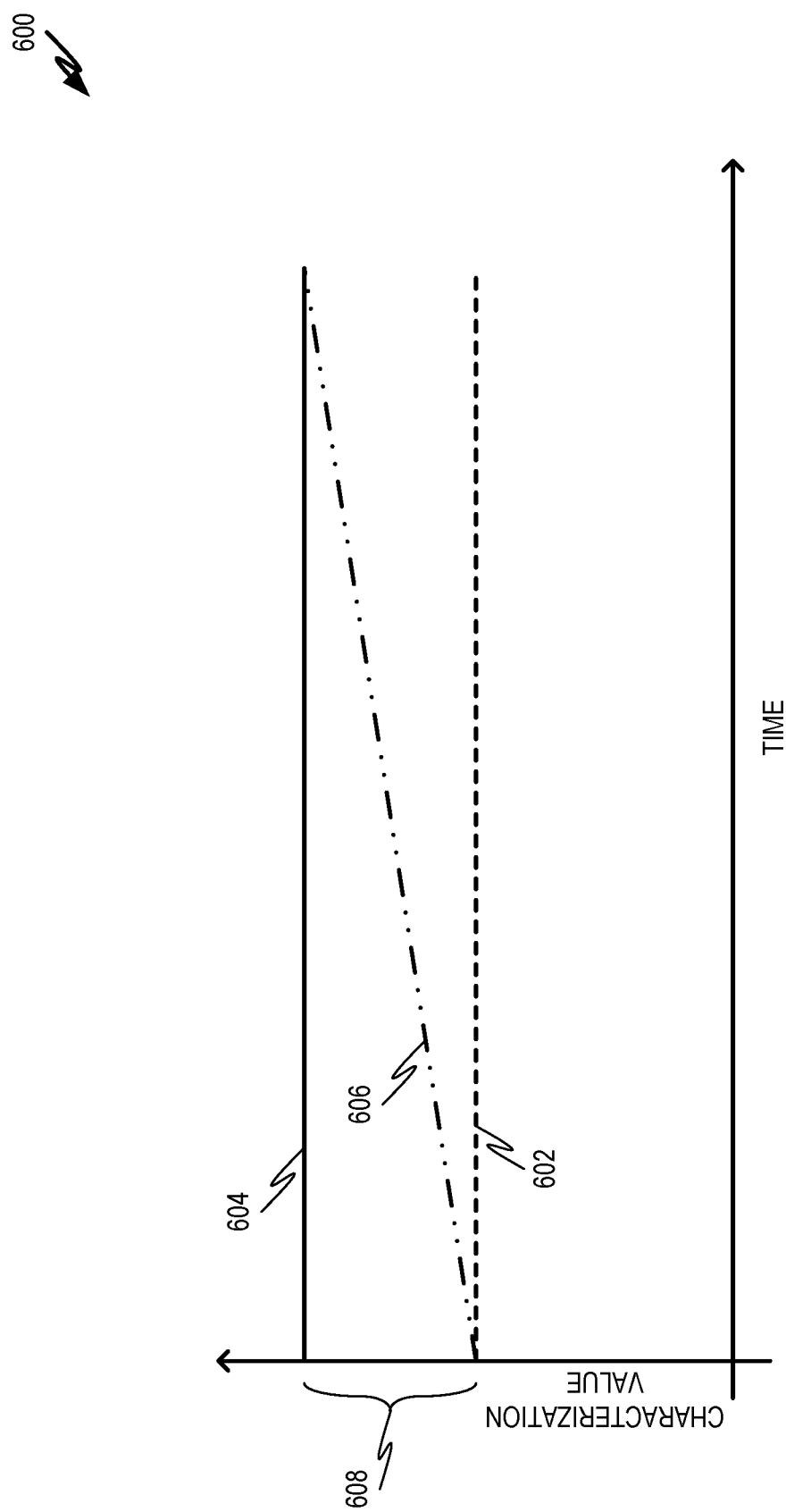
FIG. 6 is a chart illustrating one example of the operation of the process flow.

FIG. 6 is a chart 600 illustrating one example of the operation of the process flow 500. The chart 600 includes a horizontal axis indicating time and a vertical axis indicating a characterization value for an event. The value may be, for example, an experience score, a runtime for a piece of software, etc. An ML characterization line 602 indicates the ML characterization of incoming untrained events. A characterization value 604 indicates the desired characterization value for the untrained events. To achieve the desired characterization value, the computing system applies one or more complimentary characterization rules to determine a supplementary value 608. In this example, the supplementary value 608 is added to the ML characterization to generate a supplemented characterization at the desired characterization value 604.

The line 606 represents the updated ML characterization generated by the updated model. The updated ML characterization begins at the level of the ML characterization value 602 generated by the ML model. As the training ML model is retrained over time, the updated ML characterization begins to approach the desired characterization value 604. When the delta between the updated ML characterization and the desired characterization value 604 is less than a threshold (e.g., for an untrained event type), the computing system deactivates the corresponding complimentary detection rules and deploys the training ML model as the new ML model.

Figure 7:
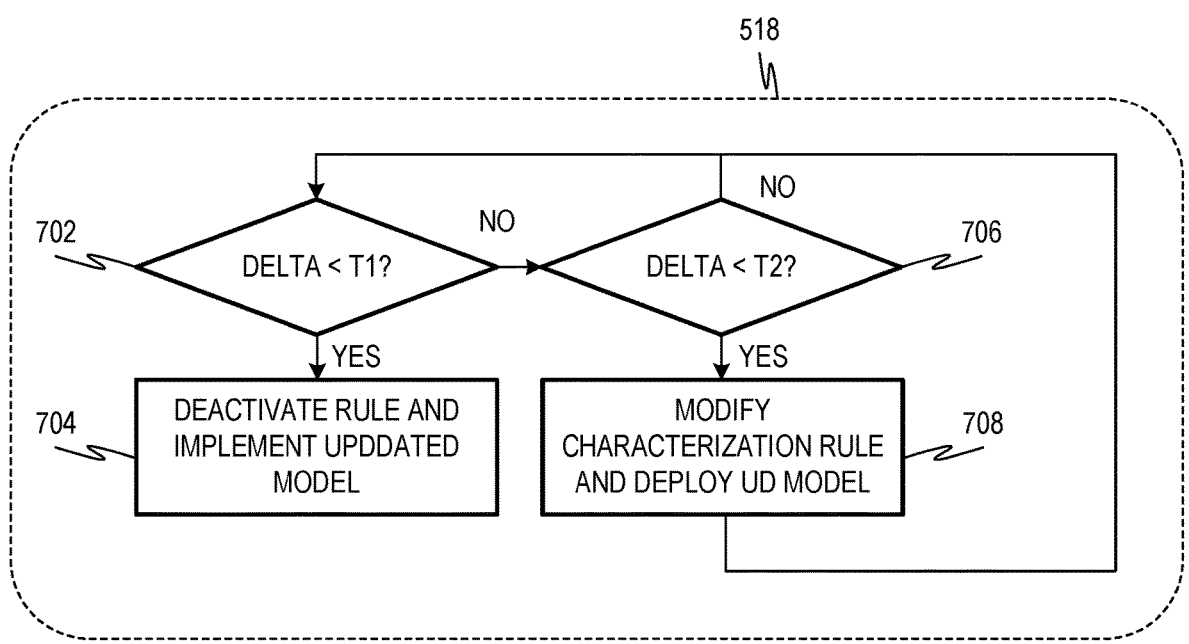
FIG. 7 is a flowchart showing an alternate arrangement of the portions of the process flow of FIG. 5 for determining when the training ML model is suitably trained to handle the untrained events.

FIG. 7 is a flowchart showing an alternate arrangement of the operations 418 for determining when the training ML model is suitably trained to handle the untrained events. At operation 702, the computing system determines whether the delta between the ML characterization and the desired characterization (e.g., indicated by the supplemented characterization) is less than a first threshold. If the difference or delta is less than the first threshold, then the computing system may, at operation 704, deactivate a complimentary detection rule or rules used for the untrained event or event type considered at operation 702 and deploy the updated model.

If the delta is not less than the first threshold at operation 702, the computing system may determine, at operation 706, whether the delta is less than a second threshold. The second threshold may be larger than the first threshold. If the delta is not less than the second threshold, the computing system returns to operation 702, for example, the next time the operations 518 are executed. If the delta is less than the second threshold, the computing system may, at operation 708, deploy the training ML model and modify the complimentary characterization rules to return a different (e.g., smaller) supplementary value. In some examples, a version of the training ML model continues to be trained with new training data from untrained events as a new training ML model. The next time the operations 518 are run, the delta is determined relative to the now-deployed training ML model. When the delta is less than the first threshold, the new updated ML model is deployed and the relevant detection rules are deactivated.

Figure 8:
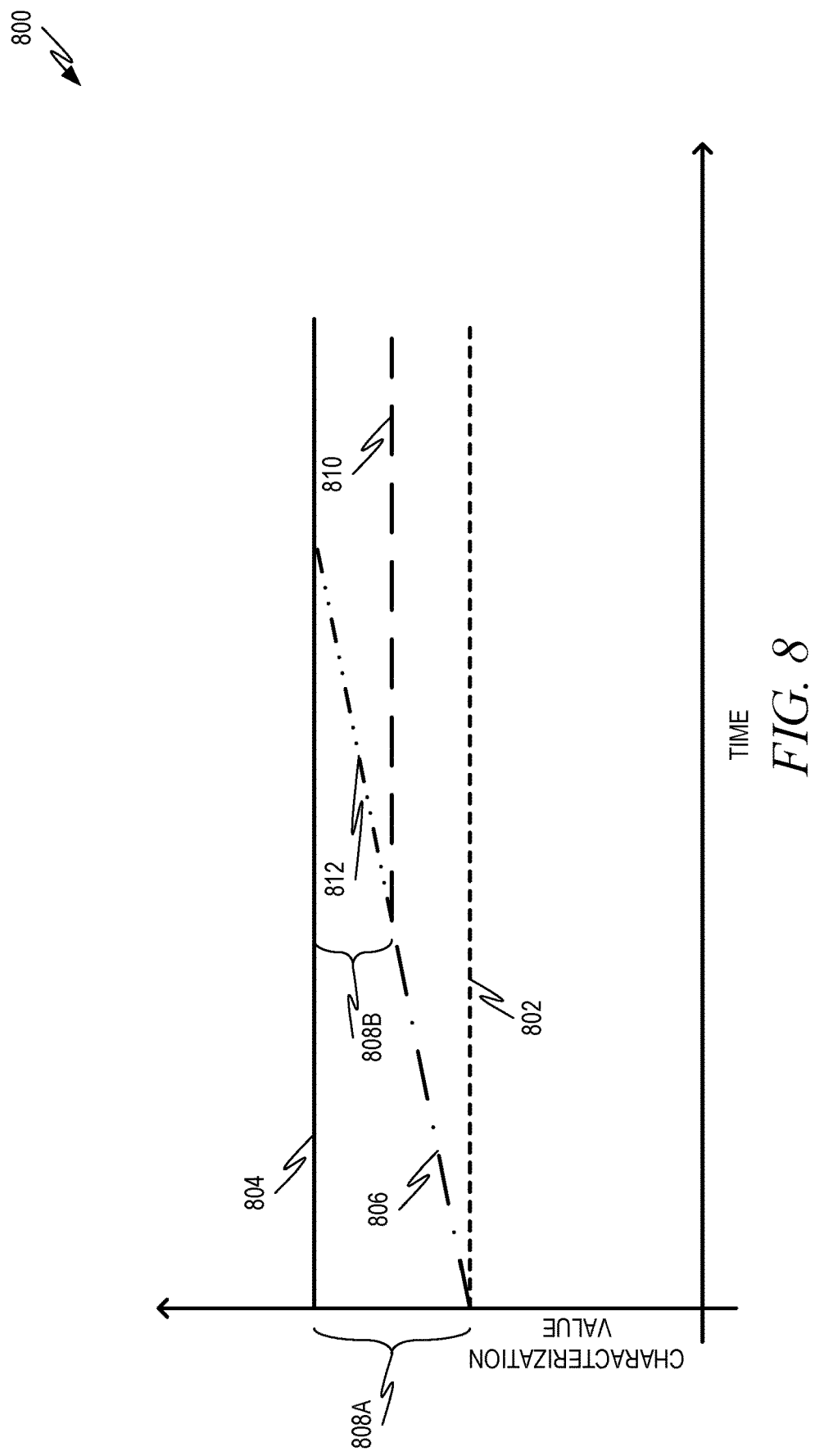
FIG. 8 is a chart illustrating one example of the operation of the process flow of FIG. 5 using the alternative operations illustrated at FIG. 7.

FIG. 8 is a chart 800 illustrating one example of the operation of the process flow 500 using the alternative operations illustrated at FIG. 7. The chart 800 includes a horizontal axis indicating time and a vertical axis indicating a characterization value for an event. The value may be, for example, an experience score, a runtime for a piece of software, etc. A ML characterization value 802 indicates the initial ML characterization of incoming untrained events. A desired characterization value 804 indicates the desired characterization value for the untrained events. To achieve the desired characterization value, the computing system applies one or more complimentary characterization rules to determine a first supplementary value 808A.

The updated ML characterization value 806 represents the updated ML characterization generated by the updated model. The updated ML characterization value 806 begins at the level of the ML characterization value 802 generated by the ML model. As the training ML model is retrained over time, the updated ML characterization begins to approach the desired characterization value 804. When the delta between the updated ML characterization and the desired characterization value 804 is less than the second threshold, the training ML model is deployed, as indicated by updated model 810. The complimentary characterization rules are modified to generate a new supplemental value 808B, which is added to the output of the now-deployed updated model 810 to generate the supplemented characterization at the desired characterization value 804. The new training ML model 812 continues to be retrained and approaches the desired characterization 804. When the delta between the new training ML model 812 and the desired characterization 804 is less than the first threshold, the relevant detection rules are deactivated and the new training ML model 812 is deployed.

Figure 9:
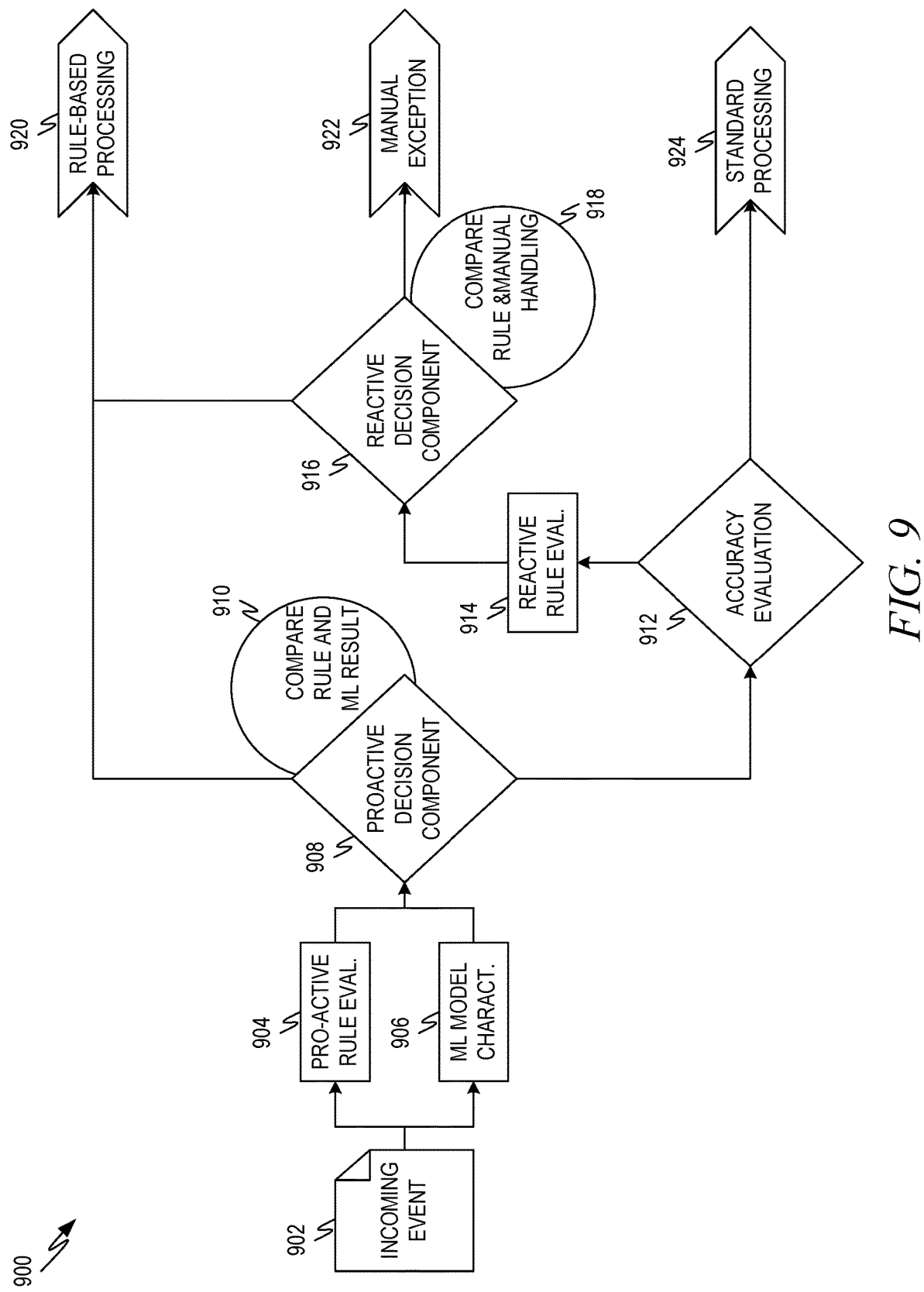
FIG. 9 is a chart showing one example of a workflow that may be used to supplement ML characterization with proactive and reactive rules at the same time.

FIG. 9 is a chart showing one example of a workflow 900 that may be used to supplement ML characterization with proactive and reactive rules at the same time. A computing system receives an incoming event 902. The incoming event 902 may be described by a feature set. At operation 904, the computing system applies a set of one or more proactive detection rules. In the IT help desk example, the proactive detection rule evaluation at operation 904 may include scanning a service request for error codes associated with a new functionality or component and returning the IT team responsible for the new functionality or feature. Concurrently, at operation 906, the currently deployed ML model may be called to generate an ML characterization of the incoming event 902.

At operation 908, the computing system determines if the application of the proactive detection rules at operation 904 indicates that the incoming event 902 is an untrained event. If the application of the proactive detection rules at operation 904 does indicate that the incoming event 902 is an untrained event, processing of the incoming event 902 may be transferred to a rule-based processing 920, which may apply one or more characterization rules to generate a rule characterization of the incoming event 902. The rule characterization may be returned as the output characterization.

If the proactive detection rules applied at operation 908 do not indicate that the incoming event 902 is an untrained event, the computing system, at operation 912, determines an accuracy of the ML characterization, for example, based on a confidence score generated by the ML characterization. If the accuracy of the ML characterization is above a threshold level, processing of the incoming event 902 is transferred to standard processing 924, which may return the ML characterization of the event as the output characterization.

If the accuracy of the ML characterization is not above a threshold level, a set of reactive detection rules are applied at operation 914. At operation 916, the computing system determines whether the reactive detection rules indicate that the incoming event 902 is an untrained event. If the reactive detection rules indicate that the incoming event 902 is an untrained event, the processing is transferred to the rule-based processing 920, which determines and returns a rule characterization of the incoming event 902 as the output characterization. If the reactive detection rules indicate that the incoming event 902 is not an untrained event, then processing of the incoming event 902 may be transferred to manual exception processing 922, which may involve human intervention to characterize the incoming event 902. For example, transferring the incoming event 902 to the manual exception processing 922 may comprise entering the incoming event 902 at a manual processing queue for processing by a human user.

The workflow 900 also shows comparison operations 910, 918. At comparison operation 910, the computing system compares the performance of the ML model and the rule-based processing 920 for proactive untrained events, for example, as described herein with respect to operations 316. At comparison operation 916, the computing system compares the performance of the ML model relative to the reactive detection rules, for example, as described herein with respect to operations 420. If at operation 910 or operation 918 it is determined that the training ML model is suitably trained to characterize the untrained events, the training ML model may be deployed and the untrained event detection rules may be modified to no longer indicate the untrained events or type of untrained events considered.

Figure 10:
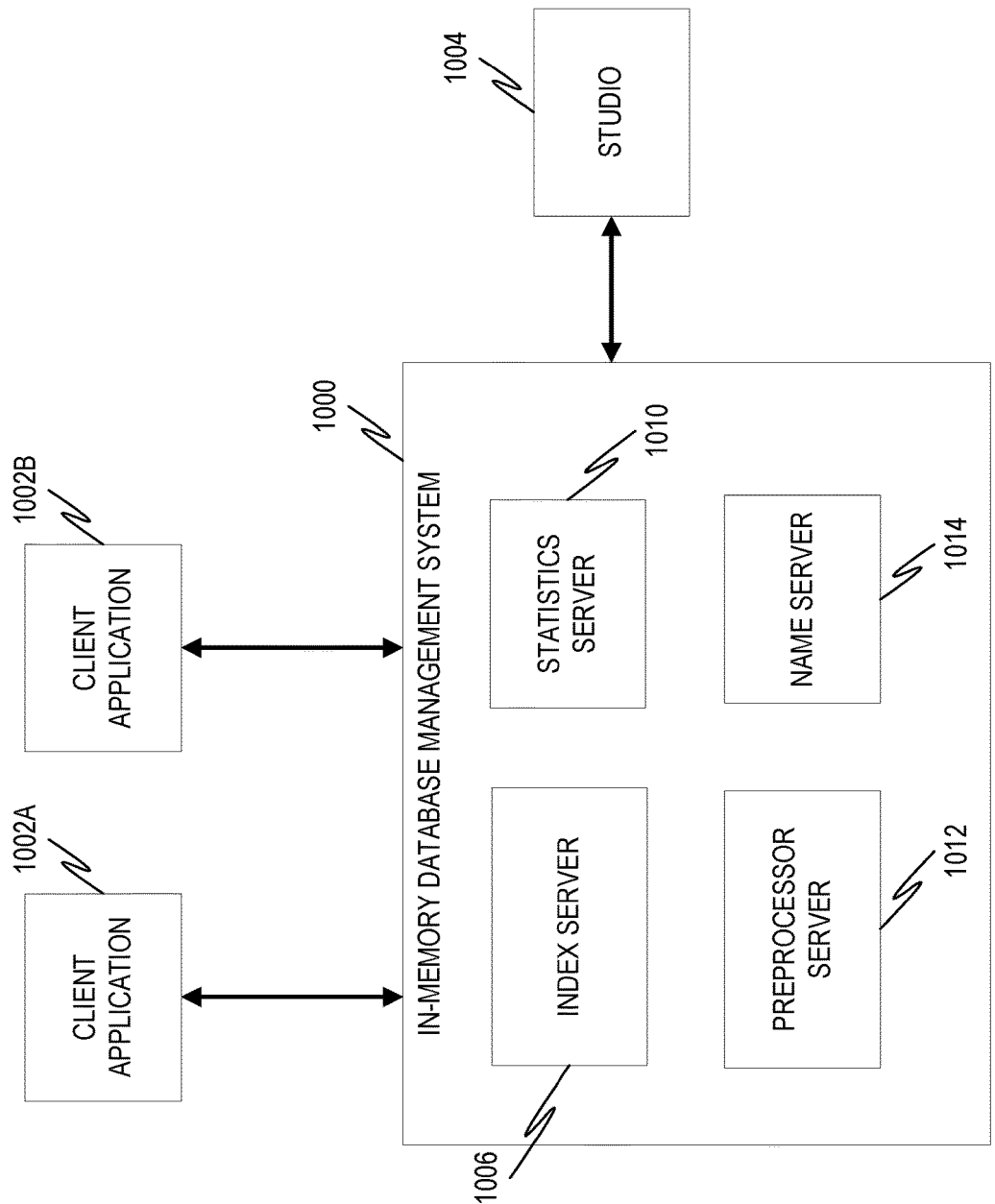
FIG. 10 is a diagram illustrating an example of an in-memory database management system that may be used to implement table privilege management, for example, as described herein.

FIG. 10 is a diagram illustrating an example of an in-memory database management system 1000. The in-memory database management system 1000 shows one example arrangement that may be used to implement some or all of the various elements of the environment 100 of FIG. 1. An in-memory database stores data primarily at main memory, such as a random access memory. This is different than databases that primarily employ a disk storage mechanism. In some examples, the database management system 1000 may be or include an example of the HANA system from SAP SE of Walldorf, Germany. Although various features of carbon footprint optimization are described herein in the context of an in-memory database, carbon footprint optimization may be generally performed at any suitable database management system.

The in-memory database management system 1000 may be coupled to one or more client applications 1002A, 1002B. Client applications 1002A, 1002B, in some examples, are used to provide computer-automated processes to client users. The client applications 1002A, 1002B may communicate with the in-memory database management system 1000 through a number of different protocols, including Structured Query Language (SQL), Multidimensional Expressions (MDX), Hypertext Transfer Protocol (HTTP), Representational State Transfer (REST), and Hypertext Markup Language (HTML). For example, characterization requests described herein may be made by one or more client applications 1002A, 1002B with the various components of the environment 100 for responding to characterization requests being implemented at the database management system 1000.

FIG. 10 also shows a studio 1004 that may be used to perform modeling by accessing the in-memory database management system 1000. In some examples, the studio 1004 may allow complex analysis to be performed on data drawn not only from real-time event data and windows, but also from stored database information. In some examples, carbon footprint data may be generated by the studio as described herein. The studio 1004, in some examples, is configured to implement the ML engine 106 and/or the rule engine 108 described herein.

The in-memory database management system 1000 may comprise a number of different components, including an index server 1006, an XS engine 1008, a statistics server 1010, a preprocessor server 1012, and a name server 1014. These components may operate on a single computing device or may be spread among multiple computing devices (e.g., separate servers). The index server 1006 contains the actual data and the engines for processing the data. It may also coordinate and use the other servers.

The statistics server 1010 collects information about status, performance, and resource consumption from all the other server components. The statistics server 1010 can be accessed from the studio 1004 to obtain the status of various alert monitors.

The preprocessor server 1012 is used for analyzing text data and extracting the information on which the text search capabilities are based.

The name server 1014 holds information about the database topology. This is used in a distributed system with instances of the database on different hosts. The name server 1014 knows where the components are running and which data is located on which server. In an example embodiment, a separate enqueue server may operate in the manner described above with respect to enqueue servers, specifically with regard to creating and managing lightweight enqueue sessions.

Figure 11:
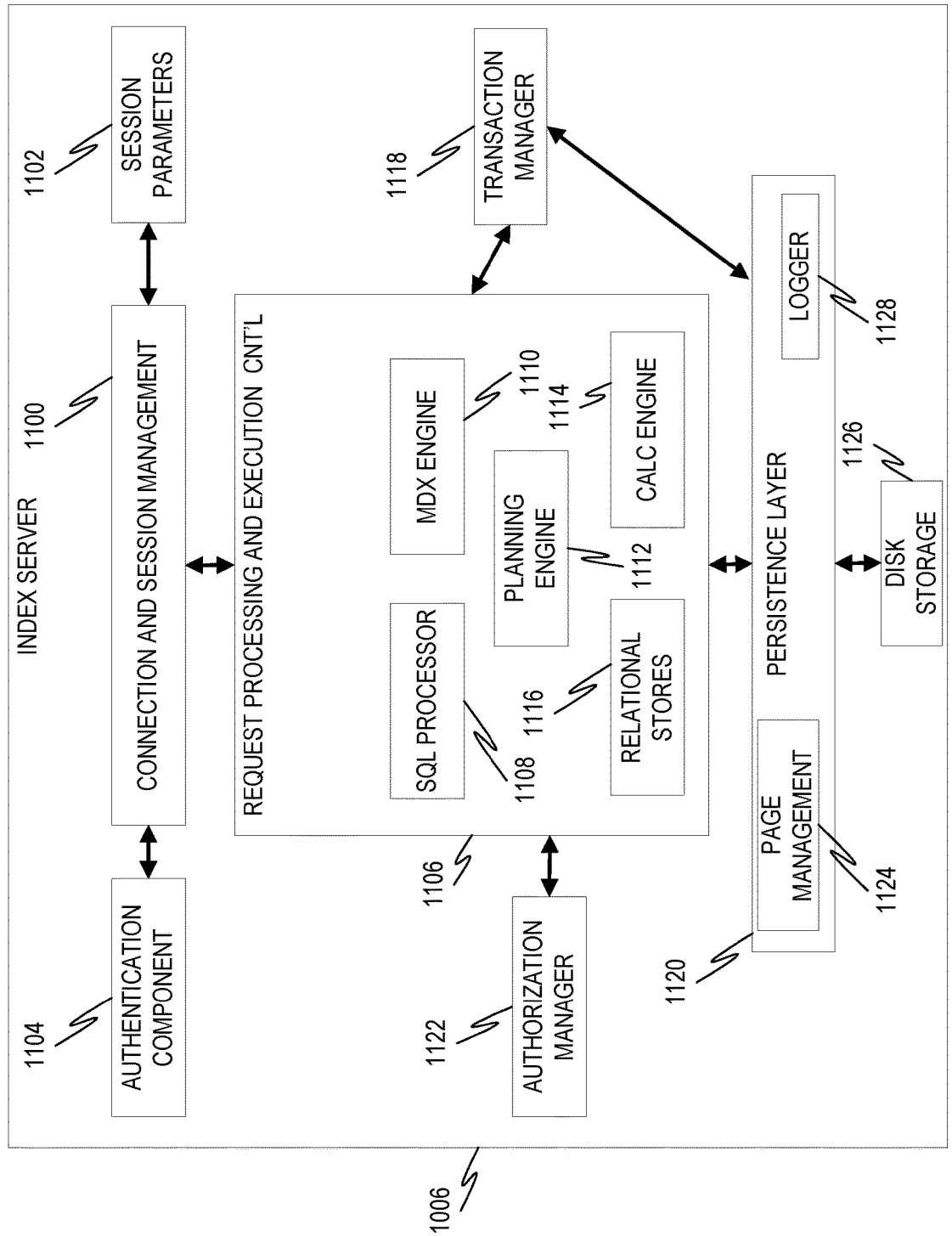
FIG. 11 is a diagram illustrating an example of an index server of the in-memory database management system of FIG. 10.

FIG. 11 is a diagram illustrating an example of the index server 1006. Specifically, the index server 1006 of FIG. 10 is depicted in more detail. The index server 1006 includes a connection and session management component 1100, which is responsible for creating and managing sessions and connections for the database clients (e.g. client applications 1002A, 1002B). Once a session is established, clients can communicate with the database system using SQL statements. For each session, a set of session parameters 1102 may be maintained, such as auto-commit, current transaction isolation level, and so forth. Users (e.g., system administrators, developers) may be authenticated by the database system itself (e.g., by logging in with log-in information such as a username and password, using an authentication component 1104) or authentication can be delegated to an external authentication provider such as a Lightweight Directory Access Protocol (LDAP) directory.

Client requests, such as contract form requests, can be analyzed and executed by a set of components summarized as request processing and execution control 1106. An SQL processor 1108 checks the syntax and semantics of the client SQL statements and generates a logical execution plan. MDX is a language for querying and manipulating multi-dimensional data stored in Online Analytical Processing (OLAP) cubes. As such, an MDX engine 1110 may be provided to allow for the parsing and executing of MDX commands. A planning engine 1112 allows applications to execute basic planning operations in the database layer. One such operation is to create a new version of a dataset as a copy of an existing dataset, while applying filters and transformations.

A calculation engine 1114 implements the various SQL script and planning operations. The calculation engine 1114 creates a logical execution plan for calculation models derived from SQL script, MDX, planning, and domain-specific models. This logical execution plan may include, for example, breaking up a model into operations that can be processed in parallel. The data is stored in relational stores 1116, which implement a relational database in main memory. Each SQL statement may be processed in the context of a transaction. New sessions are implicitly assigned to a new transaction. A transaction manager 1118 coordinates database transactions, controls transactional isolation, and keeps track of running and closed transactions. When a transaction is committed or rolled back, the transaction manager 1118 informs the involved engines about this event so they can execute needed actions. The transaction manager 1118 also cooperates with a persistence layer 1120 to achieve atomic and durable transactions.

An authorization manager 1122 is invoked by other database system components to check whether the user has the specified privileges to execute the requested operations. The database system allows for the granting of privileges to users or roles. A privilege grants the right to perform a specified operation on a specified object.

The persistence layer 1120 ensures that the database is restored to the most recent committed state after a restart and that transactions are either completely executed or completely undone. To achieve this goal in an efficient way, the persistence layer 1120 uses a combination of write-ahead logs, shadow paging, and save points. The persistence layer 1120 also offers a page management interface 1124 for writing and reading data to a separate disk storage 1126, and also contains a logger 1128 that manages the transaction log. Log entries can be written implicitly by the persistence layer 1120 when data is written via the persistence interface or explicitly by using a log interface.

Figure 12:
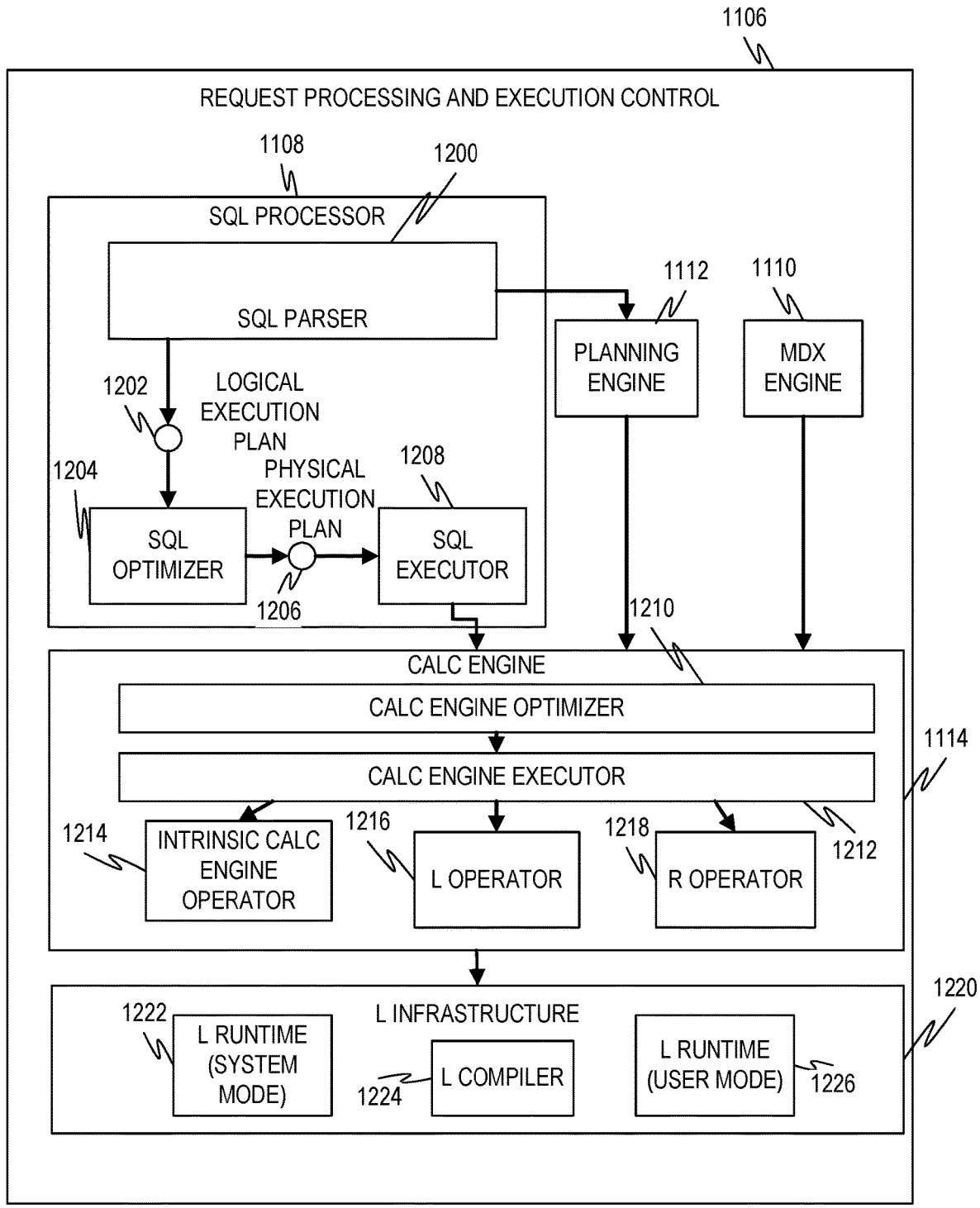
FIG. 12 is a diagram illustrating one example of the request processing and execution control of the database management system of FIG. 10.

FIG. 12 is a diagram illustrating one example of the request processing and execution control 1106. This diagram depicts the request processing and execution control 1106 of FIG. 11 in more detail. The SQL processor 1108 contains an SQL parser 1200, which parses the SQL statement and generates a logical execution plan 1202, which it passes to an SQL optimizer 1204. The SQL optimizer 1204 optimizes the logical execution plan 1202 and converts it to a physical execution plan 1206, which it then passes to a SQL executor 1208. The calculation engine 1114 implements the various SQL script and planning operations, and includes a calc engine optimizer 1210, which optimizes the operations, and a calc engine executor 1212, which executes the operations, as well as an intrinsic calc engine operator 1214, an L operator 1216, and an R operator 1218.

An L infrastructure 1220 includes a number of components to aid in the running of L procedures, including an L-runtime (system mode) 1222, an L compiler 1224, and an L-runtime (User mode) 1226.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

EXAMPLES

Example 1 is a method of executing a computer-automated process using trained machine learning (ML) models, the method comprising: accessing first event data describing a first event; executing, by one or more hardware processors, a first ML model to determine an ML characterization of the first event using the first event data; applying, by the one or more hardware processors, a first rule set to the first event data to generate a rule characterization of the first event; determining, by the one or more hardware processors, an output characterization of the first event based at least in part on the rule characterization of the first event; and determining, by the one or more hardware processors, to deactivate the first rule set based at least in part on the ML characterization of the first event.

In Example 2, the subject matter of Example 1 optionally includes before applying the first rule set to the first event data, applying a proactive detection rule set to the first event data to determine that the first event is an untrained event.

In Example 3, the subject matter of any one or more of Examples 1-2 optionally includes determining that a confidence of the ML characterization of the first event is less than a threshold level; applying a reactive detection rule set to the first event data to determine that the first event is not an untrained event; and responsive to determining that the first event is not an untrained event, sending an indication of the first event to a manual processing queue.

In Example 4, the subject matter of any one or more of Examples 1-3 optionally includes determining that a confidence of the ML characterization of the first event is less than a confidence threshold; and applying a reactive detection rule set to the first event data to determine that the first event is an untrained event, the applying of the first rule set being responsive to the determining that the first event is an untrained event.

In Example 5, the subject matter of Example 4 optionally includes receiving second event data describing a second event for characterization; executing the first ML model to determine an ML characterization of the second event using the second event data; determining that a confidence of the ML characterization of the second event is less than the confidence threshold; applying the reactive detection rule set to the first event data to determine that the first event is not an untrained event; and directing the first event to a manual exception process.

In Example 6, the subject matter of Example 5 optionally includes the determining to deactivate the first rule set being based at least in part on a ratio of events determined to be untrained events using the reactive detection rule set to events determined not to be untrained events using the reactive detection rule set.

In Example 7, the subject matter of any one or more of Examples 1-6 optionally includes the ML characterization comprising a first score for the first event, the rule characterization comprising a supplementary value, the method further comprising combining the supplementary value and the ML characterization to determine the output characterization of the first event.

In Example 8, the subject matter of any one or more of Examples 1-7 optionally includes the first ML model being a training ML model retrained using training data derived from a plurality of untrained events, the method further comprising: executing a deployed ML model to generate a deployed ML model characterization of the first event, the deployed ML model characterization comprising a score for the first event; and determining the output characterization of the first event at least in part by combining the rule characterization of the first event and the deployed ML model characterization of the first event.

In Example 9, the subject matter of Example 8 optionally includes the determining to deactivate the first rule set comprising determining that a difference between the ML characterization of the first event and a desired characterization of the first event is less than a first threshold.

In Example 10, the subject matter of any one or more of Examples 8-9 optionally includes determining that a difference between the ML characterization of the first event and a desired characterization of the first event is less than a first threshold; responsive to determining that the difference between the ML characterization of the first event and the desired characterization of the first event is less than a first threshold, deploying the first ML model; training a second version of the first ML model; and determining that a difference between at least one ML characterization generated by the second version of the first ML model and the desired characterization is less than a second threshold, the second threshold being smaller than the first threshold.

Example 11 is a system for executing a computer-automated process using trained machine learning (ML) models, the system comprising: at least one computing device comprising a processor and a memory, the at least one computing device being programmed to perform operations comprising: accessing first event data describing a first event; executing a first ML model to determine an ML characterization of the first event using the first event data; applying a first rule set to the first event data to generate a rule characterization of the first event; determining an output characterization of the first event based at least in part on the rule characterization of the first event; and determining to deactivate the first rule set based at least in part on the ML characterization of the first event.

In Example 12, the subject matter of Example 11 optionally includes the operations further comprising, before applying the first rule set to the first event data, applying a proactive detection rule set to the first event data to determine that the first event is an untrained event.

In Example 13, the subject matter of any one or more of Examples 11-12 optionally includes the operations further comprising: determining that a confidence of the ML characterization of the first event is less than a threshold level; applying a reactive detection rule set to the first event data to determine that the first event is not an untrained event; and responsive to determining that the first event is not an untrained event, sending an indication of the first event to a manual processing queue.

In Example 14, the subject matter of any one or more of Examples 11-13 optionally includes the operations further comprising: determining that a confidence of the ML characterization of the first event is less than a confidence threshold; and applying a reactive detection rule set to the first event data to determine that the first event is an untrained event, the applying of the first rule set being responsive to the determining that the first event is an untrained event.

In Example 15, the subject matter of any one or more of Examples 11-14 optionally includes the ML characterization comprising a first score for the first event, the rule characterization comprising a supplementary value, the operations further comprising combining the supplementary value and the ML characterization to determine the output characterization of the first event.

In Example 16, the subject matter of any one or more of Examples 11-15 optionally includes the first ML model being a training ML model retrained using training data derived from a plurality of untrained events, the operations further comprising: executing a deployed ML model to generate a deployed ML model characterization of the first event, the deployed ML model characterization comprising a score for the first event; and determining the output characterization of the first event at least in part by combining the rule characterization of the first event and the deployed ML characterization of the first event.

In Example 17, the subject matter of Example 16 optionally includes the determining to deactivate the first rule set comprising determining that a difference between the ML characterization of the first event and a desired characterization of the first event is less than a first threshold.

In Example 18, the subject matter of any one or more of Examples 16-17 optionally includes the operations further comprising: determining that a difference between the ML characterization of the first event and a desired characterization of the first event is less than a first threshold; responsive to determining that the difference between the ML characterization of the first event and the desired characterization of the first event is less than a first threshold, deploying the first ML model; training a second version of the first ML model; and determining that a difference between at least one ML characterization generated by the second version of the first ML model and the desired characterization is less than a second threshold, the second threshold being smaller than the first threshold.

Example 19 is a non-transitory machine-readable medium comprising instructions thereon that, when executed by at least one processor, cause the at least one processor to perform operations comprising: accessing first event data describing a first event; executing a first ML model to determine an ML characterization of the first event using the first event data; applying a first rule set to the first event data to generate a rule characterization of the first event; determining an output characterization of the first event based at least in part on the rule characterization of the first event; and determining to deactivate the first rule set based at least in part on the ML characterization of the first event.

In Example 20, the subject matter of Example 19 optionally includes the operations further comprising, before applying the first rule set to the first event data, applying a proactive detection rule set to the first event data to determine that the first event is an untrained event.

Figure 13:
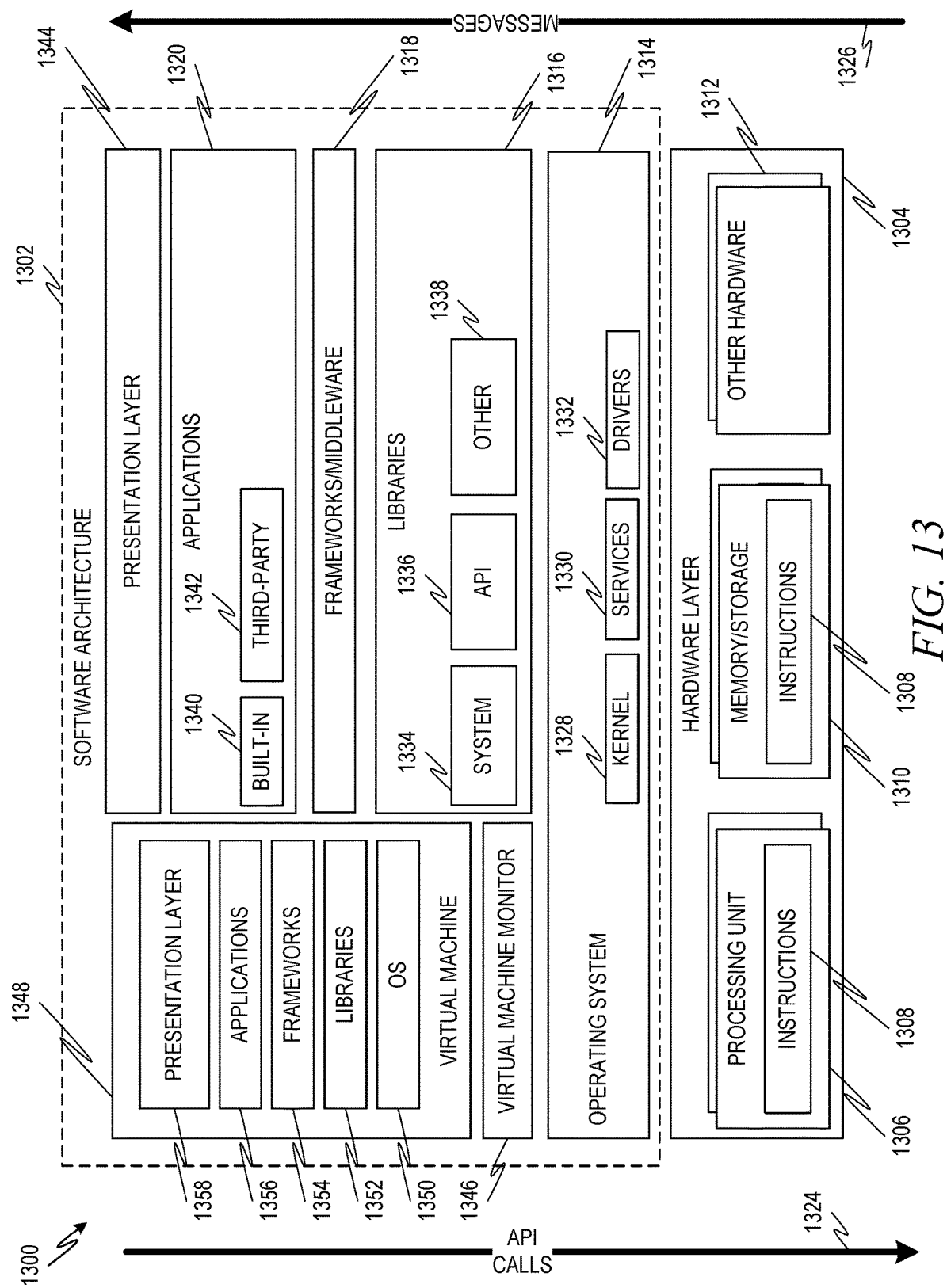
FIG. 13 is a block diagram showing one example of a software architecture for a computing device.

FIG. 13 is a block diagram 1300 showing one example of a software architecture 1302 for a computing device. The architecture 1302 may be used in conjunction with various hardware architectures, for example, as described herein.

FIG. 13 is merely a non-limiting example of a software architecture and many other architectures may be implemented to facilitate the functionality described herein. A representative hardware layer 1304 is illustrated and can represent, for example, any of the above referenced computing devices. In some examples, the hardware layer 1304 may be implemented according to the architecture of the computer system of FIG. 13.

The representative hardware layer 1304 comprises one or more processing units 1306 having associated executable instructions 1308. Executable instructions 1308 represent the executable instructions of the software architecture 1302, including implementation of the methods, modules, subsystems, and components, and so forth described herein and may also include memory and/or storage modules 1310, which also have executable instructions 1308. Hardware layer 1304 may also comprise other hardware as indicated by other hardware 1312 which represents any other hardware of the hardware layer 1304, such as the other hardware illustrated as part of the architecture 1302.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and presentation layer 1344. Operationally, the applications 1320 and/or other components within the layers may invoke API calls 1324 through the software stack and access a response, returned values, and so forth illustrated as messages 1326 in response to the API calls 1324. The layers illustrated are representative in nature and not all software architectures have all layers. For example, some mobile or special purpose operating systems may not provide a frameworks/middleware layer 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. In some examples, the services 1330 include an interrupt service. The interrupt service may detect the receipt of an interrupt and, in response, cause the architecture 1302 to pause its current processing and execute an interrupt service routine (ISR) when an interrupt is accessed.

The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system 1334 libraries (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1342 may invoke the API calls 1324 provided by the mobile operating system such as operating system 1314 to facilitate functionality described herein.

The applications 1320 may utilize built-in operating system functions (e.g., kernel 1328, services 1330 and/or drivers 1332), libraries (e.g., system 1334, API libraries 1336, and other libraries 1338), and frameworks/middleware 1318 to create user interfaces to interact with users of the system. Alternatively, or additionally, in some systems interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine creates a software environment where applications/modules can execute as if they were executing on a hardware computing device. A virtual machine is hosted by a host operating system (operating system 1314) and typically, although not always, has a virtual machine monitor 1346, which manages the operation of the virtual machine as well as the interface with the host operating system (i.e., operating system 1314). A software architecture executes within the virtual machine 1348 such as an operating system 1350, libraries 1352, frameworks/middleware 1354, applications 1356 and/or presentation layer 1358. These layers of software architecture executing within the virtual machine 1348 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 14:
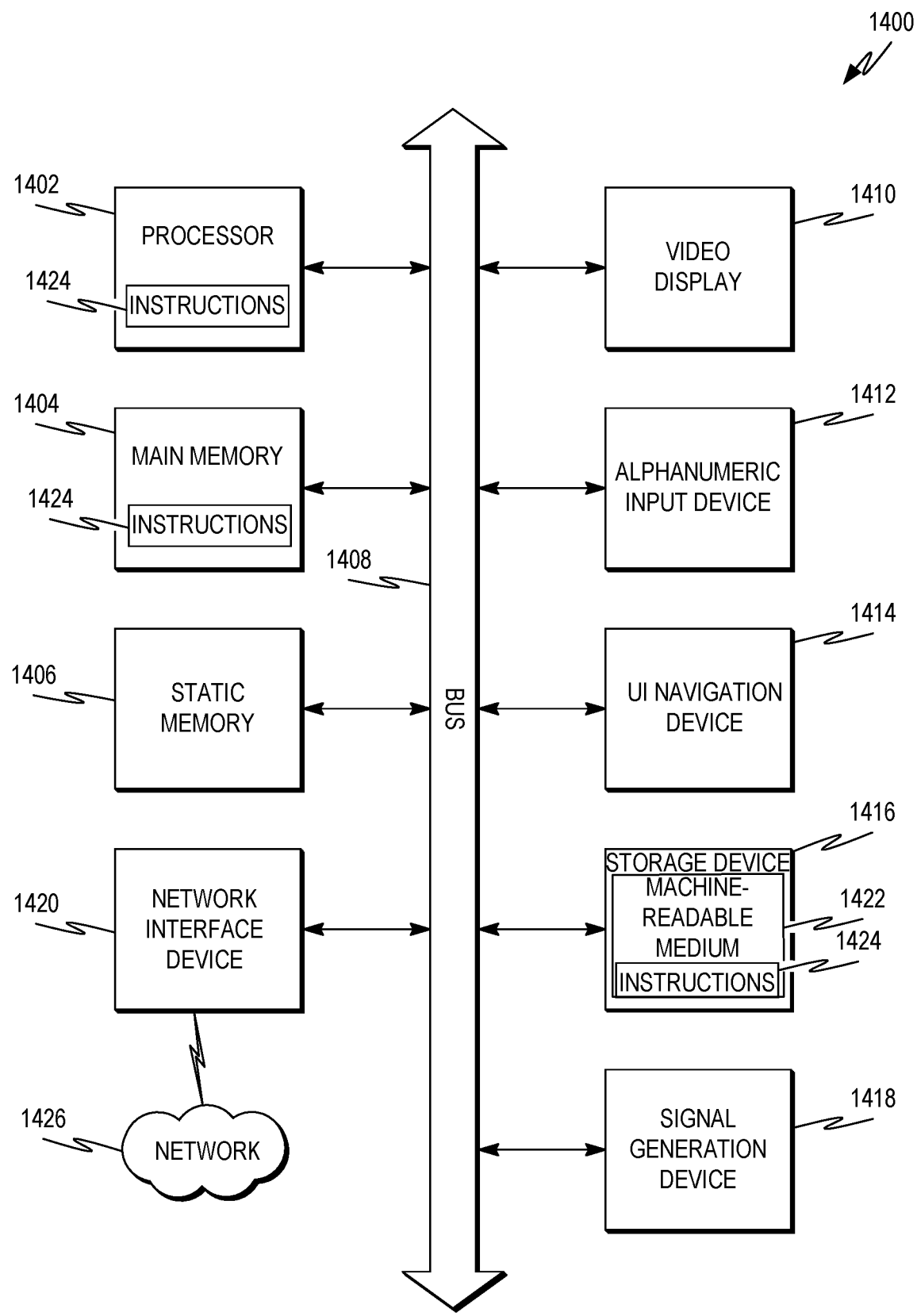
FIG. 14 is a block diagram of a machine in the example form of a computer system within which instructions may be executed for causing the machine to perform any one or more of the methodologies discussed herein.

FIG. 14 is a block diagram of a machine in the example form of a computer system 1400 within which instructions 1424 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404, and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation (or cursor control) device 1414 (e.g., a mouse), a disk drive unit 1416, a signal generation device 1418 (e.g., a speaker), and a network interface device 1420.

Machine-Readable Medium

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, with the main memory 1404 and the processor 1402 also constituting machine-readable media 1422.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding, or carrying instructions 1424 for execution by the machine and that cause the machine to perform any one or more of the methodologies of the present disclosure, or that is capable of storing, encoding, or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1424 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of executing a computer-automated process using trained machine learning (ML) models, the method comprising:
   using at least one rule set to determine that a first ML model is untrained to characterize a first event type;
   modifying the first ML model;
   accessing first event data describing a first event of the first event type;
   after modifying the first ML model, executing, by one or more hardware processors, the first ML model to determine an ML characterization of the first event using the first event data;
   applying, by the one or more hardware processors, a first rule set to the first event data to generate a rule characterization of the first event;
   determining, by the one or more hardware processors, an output characterization of the first event based at least in part on the rule characterization of the first event; and
   determining, by the one or more hardware processors, to deactivate the first rule set based at least in part on the ML characterization of the first event.

2. The method of claim 1, further comprising, before applying the first rule set to the first event data, applying a proactive detection rule set to the first event data to determine that the first event is an untrained event.

3. The method of claim 1, further comprising:
   accessing second event data describing a second event of a second event type different than the first event type;
   executing the first ML model to determine an ML characterization of the second event using the second event data;
   determining that a confidence of the ML characterization of the second event is less than a threshold level;
   applying a reactive detection rule set to the first event data to determine that the second event is not an untrained event; and
   responsive to determining that the second event is not an untrained event, sending an indication of the second event to a manual processing queue.

4. The method of claim 1, further comprising:
   accessing second event data describing a second event of a second event type different than the first event type;
   executing the first ML model to determine an ML characterization of the second event using the second event data;
   determining that a confidence of the ML characterization of the second event is less than a confidence threshold; and
   applying a reactive detection rule set to the second event data to determine that the second event is an untrained event, the applying of the first rule set being responsive to the determining that the first event is an untrained event.

5. The method of claim 4, further comprising:
   receiving third event data describing a third event for characterization;
   executing the first ML model to determine an ML characterization of the third event using the third event data;
   determining that a confidence of the ML characterization of the third event is less than the confidence threshold;
   applying the reactive detection rule set to the third event data to determine that the third event is not an untrained event; and
   directing the third event to a manual exception process.

6. The method of claim 5, the determining to deactivate the first rule set being based at least in part on a ratio of events determined to be untrained events using the reactive detection rule set to events determined not to be untrained events using the reactive detection rule set.

7. The method of claim 1, the ML characterization comprising a first score for the first event, the rule characterization comprising a supplementary value, the method further comprising combining the supplementary value and the ML characterization to determine the output characterization of the first event.

8. The method of claim 1, the first ML model being a training ML model retrained using training data derived from a plurality of untrained events, the method further comprising:
   executing a deployed ML model to generate a deployed ML model characterization of the first event, the deployed ML model characterization comprising a score for the first event; and
   determining the output characterization of the first event at least in part by combining the rule characterization of the first event and the deployed ML model characterization of the first event.

9. The method of claim 8, the determining to deactivate the first rule set comprising determining that a difference between the ML characterization of the first event and a desired characterization of the first event is less than a first threshold.

10. The method of claim 8, further comprising:
    determining that a difference between the ML characterization of the first event and a desired characterization of the first event is less than a first threshold;
    responsive to determining that the difference between the ML characterization of the first event and the desired characterization of the first event is less than a first threshold, deploying the first ML model;
    training a second version of the first ML model; and
    determining that a difference between at least one ML characterization generated by the second version of the first ML model and the desired characterization is less than a second threshold, the second threshold being smaller than the first threshold.

11. A system for executing a computer-automated process using trained machine learning (ML) models, the system comprising:
    at least one computing device comprising a processor and a memory, the at least one computing device being programmed to perform operations comprising:
    using at least one rule set to determine that a first ML model is untrained to characterize a first event type;
    modifying the first ML model;
    accessing first event data describing a first event of the first event type;
    executing the first ML model to determine an ML characterization of the first event using the first event data;
    applying a first rule set to the first event data to generate a rule characterization of the first event;
    determining an output characterization of the first event based at least in part on the rule characterization of the first event; and
    determining to deactivate the first rule set based at least in part on the ML characterization of the first event.

12. The system of claim 11, the operations further comprising, before applying the first rule set to the first event data, applying a proactive detection rule set to the first event data to determine that the first event is an untrained event.

13. The system of claim 11, the operations further comprising:

accessing second event data describing a second event of a second event type different than the first event type;

executing the first ML model to determine an ML characterization of the second event using the second event data;

determining that a confidence of the ML characterization of the second event is less than a threshold level;

applying a reactive detection rule set to the first event data to determine that the second event is not an untrained event; and responsive to determining that the second is not an untrained event, sending an indication of the second event to a manual processing queue.

14. The system of claim 11, the operations further comprising:

accessing second event data describing a second event of a second event type different than the first event type;

executing the first ML model to determine an ML characterization of the second event using the second event data;

determining that a confidence of the ML characterization of the second event is less than a confidence threshold; and applying a reactive detection rule set to the second event data to determine that the second event is an untrained event, the applying of the first rule set being responsive to the determining that the second event is an untrained event.

15. The system of claim 11, the ML characterization comprising a first score for the first event, the rule characterization comprising a supplementary value, the operations further comprising combining the supplementary value and the ML characterization to determine the output characterization of the first event.

16. The system of claim 11, the first ML model being a training ML model retrained using training data derived from a plurality of untrained events, the operations further comprising:

executing a deployed ML model to generate a deployed ML model characterization of the first event, the deployed ML model characterization comprising a score for the first event; and determining the output characterization of the first event at least in part by combining the rule characterization of the first event and the deployed ML characterization of the first event.

17. The system of claim 16, the determining to deactivate the first rule set comprising determining that a difference between the ML characterization of the first event and a desired characterization of the first event is less than a first threshold.

18. The system of claim 16, the operations further comprising:

determining that a difference between the ML characterization of the first event and a desired characterization of the first event is less than a first threshold;

responsive to determining that the difference between the ML characterization of the first event and the desired characterization of the first event is less than a first threshold, deploying the first ML model;

training a second version of the first ML model; and determining that a difference between at least one ML characterization generated by the second version of the first ML model and the desired characterization is less than a second threshold, the second threshold being smaller than the first threshold.

19. A non-transitory machine-readable medium comprising instructions thereon that, when executed by at least one processor, cause the at least one processor to perform operations comprising:

using at least one rule set to determine that a first ML model is untrained to characterize a first event type;

modifying the first ML model;

accessing first event data describing a first event of the first event type;

executing the first ML model to determine an ML characterization of the first event using the first event data;

applying a first rule set to the first event data to generate a rule characterization of the first event;

determining an output characterization of the first event based at least in part on the rule characterization of the first event; and determining to deactivate the first rule set based at least in part on the ML characterization of the first event.

20. The non-transitory machine-readable medium of claim 19, the operations further comprising, before applying the first rule set to the first event data, applying a proactive detection rule set to the first event data to determine that the first event is an untrained event.

* * * * *